United States Patent
Lin et al.

(10) Patent No.: US 11,483,875 B2
(45) Date of Patent: Oct. 25, 2022

(54) TERMINAL DEVICE, NETWORK DEVICE AND METHODS THEREIN

(71) Applicant: Telefonaktiebolaget LM Ericsson (publ), Stockholm (SE)

(72) Inventors: Zhipeng Lin, Nanjing (CN); Robert Mark Harrison, Grapevine, TX (US); Mattias Frenne, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/430,320

(22) PCT Filed: Jan. 10, 2020

(86) PCT No.: PCT/CN2020/071286
§ 371 (c)(1),
(2) Date: Aug. 11, 2021

(87) PCT Pub. No.: WO2020/164344
PCT Pub. Date: Aug. 20, 2020

(65) Prior Publication Data
US 2022/0150981 A1    May 12, 2022

(30) Foreign Application Priority Data
Feb. 15, 2019  (WO) ................ PCT/CN2019/075280

(51) Int. Cl.
*H04L 5/00*    (2006.01)
*H04W 74/08*    (2009.01)
(Continued)

(52) U.S. Cl.
CPC ....... *H04W 74/0841* (2013.01); *H04L 5/0012* (2013.01); *H04L 5/0051* (2013.01);
(Continued)

(58) Field of Classification Search
CPC ......... H04W 74/0841; H04W 74/0866; H04W 72/0446; H04W 72/1268; H04L 5/0012; H04L 5/0051
See application file for complete search history.

(56) References Cited

U.S. PATENT DOCUMENTS

2020/0245373 A1*  7/2020  Xiong .................... H04W 72/04
2021/0392693 A1* 12/2021  Kanno .............. H04W 74/0833

FOREIGN PATENT DOCUMENTS

CN    107251637 A    10/2017
CN    108432331 A    8/2018
(Continued)

OTHER PUBLICATIONS

Elena Peralta et al., 'Two-Step Random Access in 5G New Radio: Channel Structure Design and Performance', 2021 IEEE 93rd Vehicular Technology Conference, (VTC2021-Spring), pp. 1-7. (Year: 2021).*

(Continued)

*Primary Examiner* — Melvin C Marcelo
(74) *Attorney, Agent, or Firm* — Nicholson De Vos Webster & Elliott LLP

(57) ABSTRACT

A method in a terminal device. The method includes determining a DeModulation Reference Signal (DMRS) configuration for a Physical Uplink Shared Channel (PUSCH) and transmitting to a network device the PUSCH using the DMRS configuration along with a preamble, in a random access message.

18 Claims, 8 Drawing Sheets

(51) Int. Cl.
*H04W 72/04* (2009.01)
*H04W 72/12* (2009.01)
(52) U.S. Cl.
CPC ... *H04W 72/0446* (2013.01); *H04W 72/1268* (2013.01); *H04W 74/0866* (2013.01)

(56) References Cited

FOREIGN PATENT DOCUMENTS

| | | | | |
|---|---|---|---|---|
| EP | 3905828 | A1 | 11/2021 | |
| EP | 3914021 | A1 | 11/2021 | |
| EP | 3927063 | A1 * | 12/2021 | ........... H04L 5/0048 |
| JP | 2011-077647 | A | 4/2011 | |
| WO | 2016171767 | A1 | 10/2016 | |
| WO | 2018085205 | A1 | 5/2018 | |
| WO | 2018/203621 | A1 | 11/2018 | |
| WO | 2019/032296 | A1 | 2/2019 | |
| WO | WO-2020164700 | A1 * | 8/2020 | |
| WO | WO-2021025610 | A1 * | 2/2021 | |

OTHER PUBLICATIONS

R1-1700471, Sony, 'Discussions on 2 Steps RACH Procedure', 3GPP TSG RAN WG2 Meeting AH_NR Meeting, Jan. 17-19, 2017. (Year: 2017).*
Intel Corporation, "NOMA related procedure", 3GPP TSG RAN WG1 Meeting #94, R1-1808679, Aug. 20-24, 2018, 5 pages.
LG Electronics, "Initial access and mobility for NR unlicensed operation", 3GPP TSG RAN WG1 Meeting #94, R1-1808508, Aug. 20-24, 2018, 12 pages.
International Search Report and Written Opinion for Application No. PCT/CN2020/071286, dated Apr. 9, 2020, 9 pages.
International Preliminary Report on Patentability for Application No. PCT/CN2020/071286, dated May 26, 2021, 22 pages.
Mediatek Inc., "On 2-step random access procedure and physical channel in NR," Jan. 16-20, 2017, 7 pages, 3GPP TSG RAN WG1 Meeting #87, R1-1700172, Spokane, WA.
3GPP TS 38.211 V15.4.0, "3rd Generation Partnership Project; Technical Specification Group Radio Access Network; NR; Physical channels and modulation (Release 15)," Dec. 2018, 96 pages, 3GPP Organizational Partners.
3GPP TS 38.214 V15.4.0, "3rd Generation Partnership Project; Technical Specification Group Radio Access Network; NR; Physical layer procedures for data (Release 15)," Dec. 2018, 102 pages, 3GPP Organizational Partners.
European Search Report and Search Opinion, EP App No. 20755621.8, dated Dec. 6, 2021, 7 pages.
Notice of Preliminary Rejection, KR App. No. 10-2021-7027100, dated Sep. 30, 2021, 9 pages (4 pages of English Translation and 5 pages of Original Document).
Notice of Final Rejection, KR App. No. 10-2021-7027100, dated Jan. 25, 2022, 6 pages (3 pages of English Translation and 3 pages of Original Document).
Grant of Patent, KR App. No. 10-2021-7027100, Mar. 4, 2022, 4 pages (2 pages of English Translation and 2 pages of Original Document).
Office Action, JP App. No. 2021-535201, dated Feb. 14, 2022, 4 pages (1 page of English Translation and 3 pages of Original Document).
Communication pursuant to Article 94(3) EPC, EP App. No. 20755621.8, dated Mar. 29, 2022, 4 pages.
Office Action, JP App. No. 2021-535201, dated Aug. 8, 2022, 6 pages (3 page of English Translation and 3 pages of Original Document).

* cited by examiner

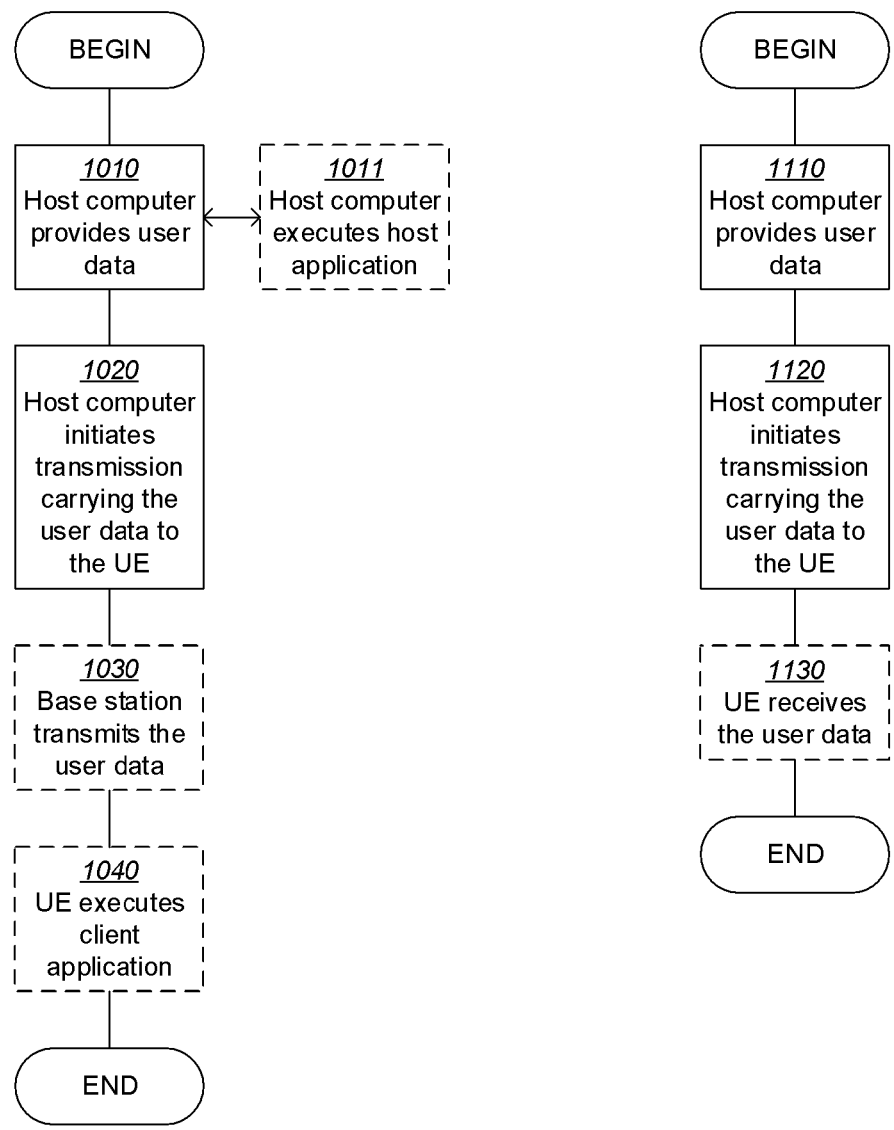

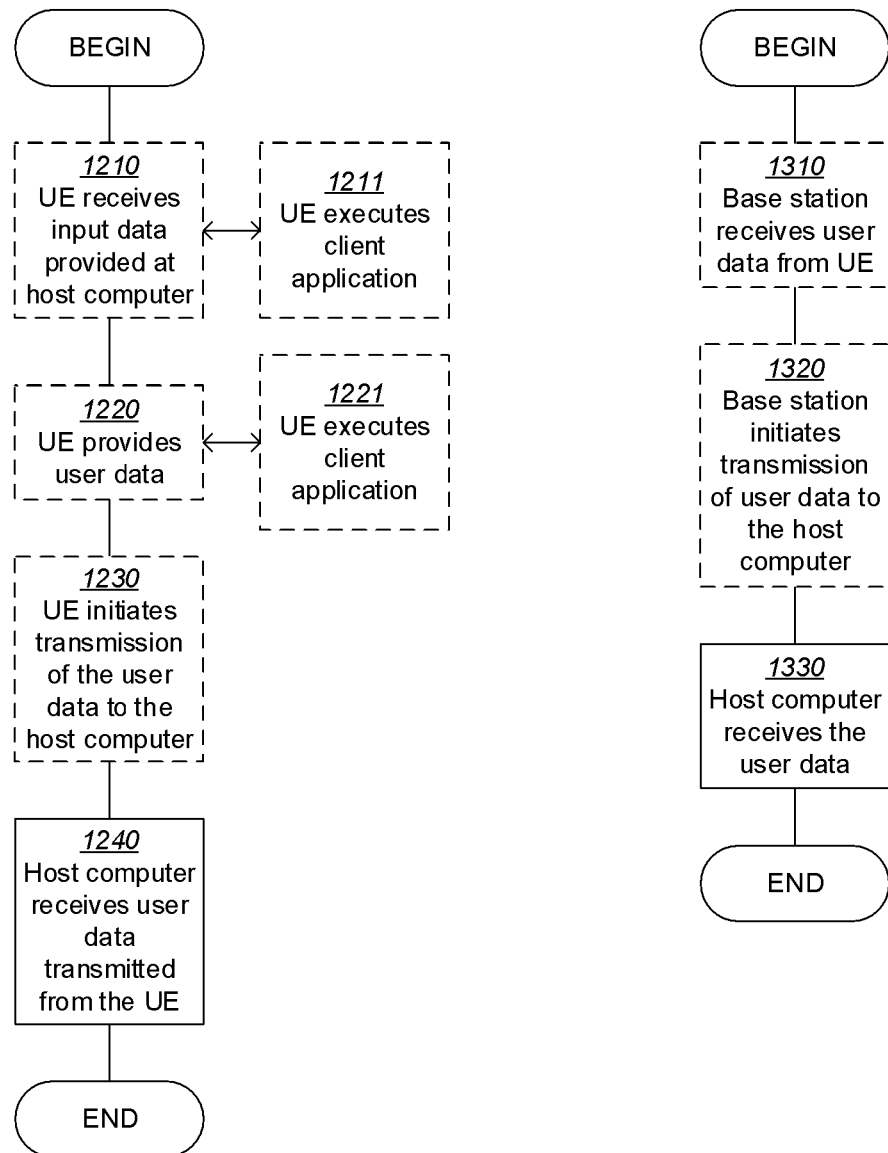

TERMINAL DEVICE, NETWORK DEVICE AND METHODS THEREIN

CROSS-REFERENCE TO RELATED APPLICATIONS

This application is a National stage of International Application No. PCT/CN2020/071286, filed Jan. 10, 2020, which claims priority to International Application No. PCT/CN2019/075280, filed Feb. 15, 2019, which are hereby incorporated by reference.

TECHNICAL FIELD

The present disclosure relates to wireless communication, and more particularly, to a terminal device, a network device and methods therein.

BACKGROUND

Random access is performed by a terminal device, e.g., User Equipment (UE), in New Radio (NR) and Long Term Evolution (LTE) networks for accessing a new cell. Once a random access procedure is completed, a terminal device can be connected to a network device, e.g., evolved NodeB (eNB) or (next) generation NodeB (gNB), and communicate with the network device using dedicated transmissions.

A four-step random access procedure has been defined for NR. FIG. 1A shows a signaling sequence of a four-step random access procedure. As shown, at 101, a UE detects a Synchronization Signal (SS) from a gNB. At 102, the UE decodes Master Information Block (MIB) and System Information Block (SIB) (i.e., Remaining Minimum System Information (RMSI) and Other System Information (OSI), which may be distributed over multiple physical channels such as Physical Broadcast Channel (PBCH) and Physical Downlink Shared Channel (PDSCH), to acquire random access transmission parameters. At 111, where the UE transmits a Physical Random Access Channel (PRACH) preamble, or Message 1, to the gNB. The gNB detects the Message 1 and responds with a Random Access Response (RAR), or Message 2, at 112. At 113, the UE transmits a Physical Uplink Shared Channel (PUSCH), or Message 3, to the gNB in accordance with configuration information for PUSCH transmission carried in the RAR. At 114, the gNB transmits a Contention Resolution Message, or Message 4, to the UE.

In order to minimize the number of channel accesses, which is important for e.g. operations in unlicensed frequency bands where Listen Before Talk (LBT) is required before transmission, a two-step random access procedure has also been proposed for NR. Instead of using the four steps 111~114, the two-step random access procedure completes random access in only two steps, also referred to as Message A and Message B. FIG. 1B shows a signaling sequence of a two-step random access procedure. As shown, the steps 101~102 in FIG. 1B are the same as the steps 101~102 in FIG. 1A. At 121, the UE transmits a PRACH preamble and a PUSCH in one message (i.e., Message A) to the gNB. The PUSCH may include higher layer data such as Radio Resource Control (RRC) connection request, possibly with some small additional payload. At 122, the gNB transmits Message B to the UE, including UE identifier assignment, timing advance information and CRM, etc.

A DeModulation Reference Signal (DMRS) is transmitted with the PUSCH (Message 3 in FIG. 1A or Message A in FIG. 1B), for use by the gNB to estimate an uplink channel so as to demodulate the PUSCH.

SUMMARY

It is an object of the present disclosure to provide a terminal device, a network device and methods therein, capable of determining a DMRS configuration to be used for a PUSCH in a two-step random access procedure.

According to a first aspect of the present disclosure, a method in a terminal device is provided. The method includes: determining a DMRS configuration for a PUSCH; and transmitting to a network device the PUSCH using the DMRS configuration along with a preamble, in a random access message.

In an embodiment, the operation of determining the DMRS configuration may be based on one or more of: a frequency hopping configuration, a PUSCH mapping type, a PUSCH duration, a number of symbols for the DMRS, a maximum number of additional DMRS symbols, or a Code Division Multiplexing (CDM) group type.

In an embodiment, the DMRS configuration may include a time domain resource for DMRS. The operation of determining the DMRS configuration may include determining the time domain resource for DMRS based on one or more of: a frequency hopping configuration, a PUSCH mapping type, a PUSCH duration, a number of symbols for the DMRS, a maximum number of additional DMRS symbols, or a CDM group type.

In an embodiment, the one or more of the frequency hopping configuration, the PUSCH mapping type, the PUSCH duration, the number of symbols for DMRS, the maximum number of additional DMRS symbols or the CDM group type may be predetermined by default or determined based on a resource and/or sequence for the preamble.

In an embodiment, the one or more of the frequency hopping configuration, the PUSCH mapping type, the PUSCH duration, the number of symbols for DMRS, the maximum number of additional DMRS symbols or the CDM group type may be received from the network device via signaling.

In an embodiment, the signaling may include Radio Resource Control (RRC) signaling or Layer 1 signaling. The RRC signaling may include a system information message and/or a dedicated signaling message, and the Layer 1 signaling may include Downlink Control Information (DCI).

In an embodiment, the maximum number of additional DMRS symbols may be determined based on a moving speed of the terminal device.

In an embodiment, the time domain resource for DMRS may be determined based on a predetermined mapping between the time domain resource for DRMS and the one or more of the frequency hopping configuration, the PUSCH mapping type, the PUSCH duration, the number of symbols for DMRS, the maximum number of additional DMRS symbols or the CDM group type.

In an embodiment, the DMRS configuration may include a DMRS port and/or a DMRS sequence. The operation of determining the DMRS configuration may include determining the DMRS port and/or the DMRS sequence based on a resource and/or sequence for the preamble and/or on a resource for the PUSCH.

In an embodiment, the operation of determining the DMRS port and/or the DMRS sequence may include: determining the DMRS port as a DMRS port that is mapped to the resource and/or sequence for the preamble and/or to the resource for the PUSCH, and/or determining the DMRS sequence as a DMRS sequence that is mapped to the resource and/or sequence for the preamble and/or to the resource for the PUSCH. Alternatively, the operation of determining the DMRS port and/or the DMRS sequence may include: selecting the DMRS port randomly from a set of DMRS ports that are mapped to the resource and/or sequence for the preamble and/or to the resource for the PUSCH, and/or selecting the DMRS sequence randomly from a set of DMRS sequences that are mapped to the resource and/or sequence for the preamble and/or to the resource for the PUSCH.

In an embodiment, the operation of determining the DMRS sequence may include: generating the DMRS sequence by using an identifier of the preamble as an initialization parameter.

In an embodiment, the random access message may be a message in a two-step random access procedure.

In an embodiment, the preamble may be selected from a set of preambles reserved for two-step random access only, or the PUSCH may be transmitted over a time-frequency resource selected from a set of time-frequency resources reserved for two-step random access only.

According to a second aspect of the present disclosure, a terminal device is provided. The terminal device includes: a determining unit configured to determine a DMRS configuration for a PUSCH; and a transmitting unit configured to transmit to a network device the PUSCH using the DMRS configuration along with a preamble, in a random access message.

The respective embodiments and features described above in connection with the first aspect also apply to the second aspect.

According to a third aspect of the present disclosure, a terminal device is provided. The terminal device includes a transceiver, a processor and a memory. The memory contains instructions executable by the processor whereby the terminal device is operative to: determine a DMRS configuration for a PUSCH; and transmit to a network device the PUSCH using the DMRS configuration along with a preamble, in a random access message.

In an embodiment, the memory may further contain instructions executable by the processor whereby the terminal device is operative to perform the method according to the above first aspect.

According to a fourth aspect of the present disclosure, a computer readable storage medium is provided. The computer readable storage medium has computer program instructions stored thereon. The computer program instructions, when executed by a processor in a terminal device, cause the terminal device to: determine a DMRS configuration for a PUSCH; and transmit to a network device the PUSCH using the DMRS configuration along with a preamble, in a random access message.

In an embodiment, the computer program instructions, when executed by the processor in the terminal device, may further cause the terminal device to perform the method according to the above first aspect.

According to a fifth aspect of the present disclosure, a method in a network device is provided. The method includes: detecting a preamble from a terminal device, as a part of a random access message, the random access message further including a PUSCH; and determining a DMRS configuration for the PUSCH.

In an embodiment, the operation of determining the DMRS configuration may be based on one or more of: a frequency hopping configuration, a PUSCH mapping type, a PUSCH duration, a number of symbols for the DMRS, a maximum number of additional DMRS symbols, or a CDM group type.

In an embodiment, the DMRS configuration may include a time domain resource for DMRS. The operation of determining the DMRS configuration may include determining the time domain resource for DMRS based on one or more of: a frequency hopping configuration, a PUSCH mapping type, a PUSCH duration, a number of symbols for the DMRS, a maximum number of additional DMRS symbols, or a CDM group type.

In an embodiment, the one or more of the frequency hopping configuration, the PUSCH mapping type, the PUSCH duration, the number of symbols for DMRS, the maximum number of additional DMRS symbols or the CDM group type may be predetermined by default or determined based on a resource and/or sequence for the preamble.

In an embodiment, the method may further include transmitting the one or more of the frequency hopping configuration, the PUSCH mapping type, the PUSCH duration, the number of symbols for DMRS, the maximum number of additional DMRS symbols or the CDM group type to the terminal device via signaling.

In an embodiment, the signaling may include RRC signaling or Layer 1 signaling. The RRC signaling may include a system information message and/or a dedicated signaling message, and the Layer 1 signaling may include DCI.

In an embodiment, the maximum number of additional DMRS symbols may be determined based on a moving speed of the terminal device.

In an embodiment, the time domain resource for DMRS may be determined based on a predetermined mapping between the time domain resource for DRMS and the one or more of the frequency hopping configuration, the PUSCH mapping type, the PUSCH duration, the number of symbols for DMRS, the maximum number of additional DMRS symbols or the CDM group type.

In an embodiment, the DMRS configuration may include a DMRS port and/or a DMRS sequence. The operation of determining the DMRS configuration may include determining the DMRS port and/or the DMRS sequence based on a resource and/or sequence for the preamble and/or on a resource for the PUSCH.

In an embodiment, the operation of determining the DMRS port and/or the DMRS sequence may include: determining the DMRS port as a DMRS port that is mapped to the resource and/or sequence for the preamble and/or to the resource for the PUSCH, and/or determining the DMRS sequence as a DMRS sequence that is mapped to the resource and/or sequence for the preamble and/or to the resource for the PUSCH. Alternatively, the operation of determining the DMRS port and/or the DMRS sequence may include: determining the DMRS port randomly from a set of DMRS ports that are mapped to the resource and/or sequence for the preamble and/or to the resource for the PUSCH, and/or determining the DMRS sequence randomly from a set of DMRS sequences that are mapped to the resource and/or sequence for the preamble and/or to the resource for the PUSCH.

In an embodiment, the operation of determining the DMRS sequence may include: generating the DMRS sequence by using an identifier of the preamble as an initialization parameter.

In an embodiment, the random access message may be a message in a two-step random access procedure. The operation of detecting the preamble as a part of the random access message may include: determining that the preamble is selected from a set of preambles reserved for two-step random access only, or that the PUSCH is transmitted over a time-frequency resource selected from a set of time-frequency resources reserved for two-step random access only.

In an embodiment, the method may further include demodulating the PUSCH based on the DMRS configuration.

According to a sixth aspect of the present disclosure, a network device is provided. The network device includes: a detecting unit configured to detect a preamble from a terminal device, as a part of a random access message, the random access message further including a PUSCH; and a determining unit configured to determine a DMRS configuration for the PUSCH.

The respective embodiments and features described above in connection with the fifth aspect also apply to the sixth aspect.

According to a seventh aspect of the present disclosure, a network device is provided. The network device includes a transceiver, a processor and a memory. The memory contains instructions executable by the processor whereby the network device is operative to: detect a preamble from a terminal device, as a part of a random access message, the random access message further including a PUSCH; and determine a DMRS configuration for the PUSCH.

In an embodiment, the memory may further contain instructions executable by the processor whereby the network device is operative to perform the method according to the above fifth aspect.

According to an eighth aspect of the present disclosure, a computer readable storage medium is provided. The computer readable storage medium has computer program instructions stored thereon. The computer program instructions, when executed by a processor in a network device, cause the network device to: detect a preamble from a terminal device, as a part of a random access message, the random access message further including a PUSCH; and determine a DMRS configuration for the PUSCH.

In an embodiment, the computer program instructions, when executed by a processor in a network device, may further cause the network device to perform the method according to the above fifth aspect.

According to a ninth aspect of the present disclosure, a communication system is provided. The communication system includes a host computer including: processing circuitry configured to provide user data; and a communication interface configured to forward the user data to a cellular network for transmission to a UE. The cellular network includes a base station having a radio interface and processing circuitry. The base station's processing circuitry is configured to perform the method according to the fifth aspect.

In an embodiment, the communication system can further include the base station.

In an embodiment, the communication system can further include the UE. The UE is configured to communicate with the base station.

In an embodiment, the processing circuitry of the host computer can be configured to execute a host application, thereby providing the user data. The UE can include processing circuitry configured to execute a client application associated with the host application.

According to a tenth aspect of the present disclosure, a method is provided. The method is implemented in a communication system including a host computer, a base station and a UE. The method includes: at the host computer, providing user data; and at the host computer, initiating a transmission carrying the user data to the UE via a cellular network comprising the base station. The base station can perform the method according to the fifth aspect.

In an embodiment, the method further can include: at the base station, transmitting the user data.

In an embodiment, the user data can be provided at the host computer by executing a host application. The method can further include: at the UE, executing a client application associated with the host application.

According to an eleventh aspect of the present disclosure, a communication system is provided. The communication system includes a host computer including: processing circuitry configured to provide user data; and a communication interface configured to forward user data to a cellular network for transmission to a UE. The UE includes a radio interface and processing circuitry. The UE's processing circuitry is configured to perform the method according to the first aspect.

In an embodiment, the communication system can further include the UE.

In an embodiment, the cellular network can further include a base station configured to communicate with the UE.

In an embodiment, the processing circuitry of the host computer can be configured to execute a host application, thereby providing the user data. The UE's processing circuitry can be configured to execute a client application associated with the host application.

According to a twelfth aspect of the present disclosure, a method is provided. The method is implemented in a communication system including a host computer, a base station and a UE. The method includes: at the host computer, providing user data; and at the host computer, initiating a transmission carrying the user data to the UE via a cellular network comprising the base station. The UE can perform the method according to the first aspect.

In an embodiment, the method can further include: at the UE, receiving the user data from the base station.

According to a thirteenth aspect of the present disclosure, a communication system is provided. The communication system includes a host computer including: a communication interface configured to receive user data originating from a transmission from a UE to a base station. The UE includes a radio interface and processing circuitry. The UE's processing circuitry is configured to: perform the method according to the first aspect.

In an embodiment, the communication system can further include the UE.

In an embodiment, the communication system can further include the base station. The base station can include a radio interface configured to communicate with the UE and a communication interface configured to forward to the host computer the user data carried by a transmission from the UE to the base station.

In an embodiment, the processing circuitry of the host computer can be configured to execute a host application. The UE's processing circuitry can be configured to execute a client application associated with the host application, thereby providing the user data.

In an embodiment, the processing circuitry of the host computer can be configured to execute a host application, thereby providing request data. The UE's processing circuitry can be configured to execute a client application associated with the host application, thereby providing the user data in response to the request data.

According to a fourteenth aspect of the present disclosure, a method is provided. The method is implemented in a communication system including a host computer, a base station and a UE. The method includes: at the host computer, receiving user data transmitted to the base station from the UE. The UE can perform the method according to the first aspect.

In an embodiment, the method can further include: at the UE, providing the user data to the base station.

In an embodiment, the method can further include: at the UE, executing a client application, thereby providing the user data to be transmitted; and at the host computer, executing a host application associated with the client application.

In an embodiment, the method can further include: at the UE, executing a client application; and at the UE, receiving input data to the client application, the input data being provided at the host computer by executing a host application associated with the client application. The user data to be transmitted is provided by the client application in response to the input data.

According to a fifteenth aspect of the present disclosure, a communication system is provided. The communication system includes a host computer including a communication interface configured to receive user data originating from a transmission from a UE to a base station. The base station includes a radio interface and processing circuitry. The base station's processing circuitry is configured to perform the method according to the fifth aspect.

In an embodiment, the communication system can further include the base station.

In an embodiment, the communication system can further include the UE. The UE can be configured to communicate with the base station.

In an embodiment, the processing circuitry of the host computer can be configured to execute a host application; the UE can be configured to execute a client application associated with the host application, thereby providing the user data to be received by the host computer.

According to a sixteenth aspect of the present disclosure, a method is provided. The method is implemented in a communication system including a host computer, a base station and a UE. The method includes: at the host computer, receiving, from the base station, user data originating from a transmission which the base station has received from the UE. The base station can perform the method according to the fifth aspect.

In an embodiment, the method can further include: at the base station, receiving the user data from the UE.

In an embodiment, the method can further include: at the base station, initiating a transmission of the received user data to the host computer.

With the embodiments of the present disclosure, the DMRS configuration to be used for a PUSCH in a two-step random access procedure can be determined, such that a DMRS can be transmitted and/or received accordingly and thus the PUSCH can be demodulated properly.

BRIEF DESCRIPTION OF THE DRAWINGS

The above and other objects, features and advantages will be more apparent from the following description of embodiments with reference to the figures, in which:

FIGS. 10 to 13 are flowcharts illustrating methods implemented in a communication system including a host computer, a base station and a user equipment.

DETAILED DESCRIPTION

Figure 1A:
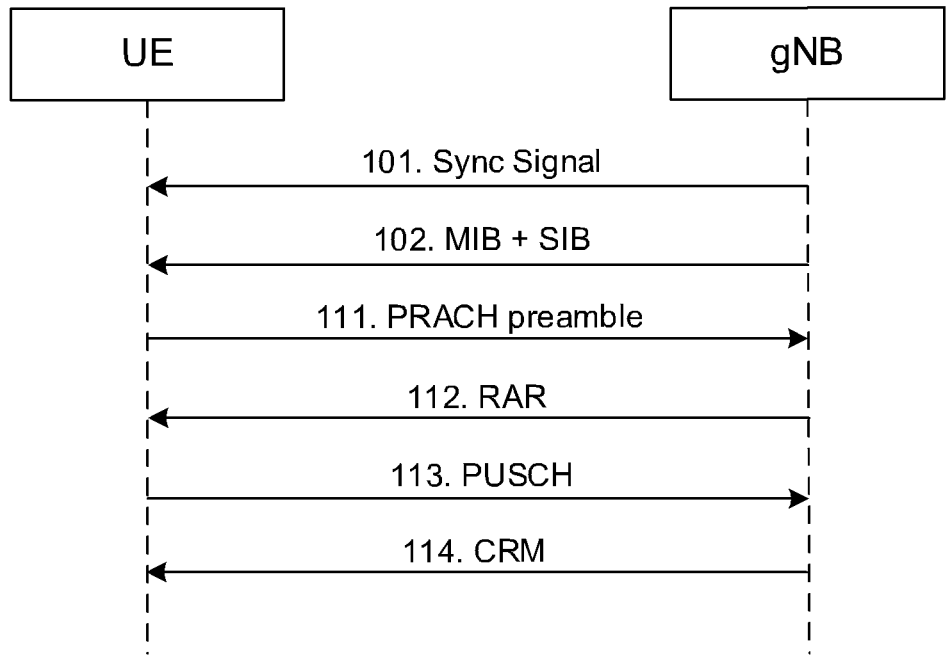
FIG. 1A is a sequence diagram showing a four-step random access procedure.

As used herein, the term "wireless communication network" refers to a network following any suitable communication standards, such as NR, LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, Global System for Mobile Communications (GSM), Universal Mobile Telecommunications System (UMTS), Long Term Evolution (LTE), and/or other suitable 1G (the first generation), 2G (the second generation), 2.5G, 2.75G, 3G (the third generation), 4G (the fourth generation), 4.5G, 5G (the fifth generation) communication protocols, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network node" or "network device" refers to a device in a wireless communication network via which a terminal device accesses the network and receives services therefrom. The network node or network device refers to a base station (BS), an access point (AP), or any other suitable device in the wireless communication network. The BS may be, for example, a node B (NodeB or NB), an evolved NodeB (eNodeB or eNB), or gNB, a Remote Radio Unit (RRU), a radio header (RH), a remote radio head (RRH), a relay, a low power node such as a femto, a pico, and so forth. Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, desktop computers, image capture terminal devices such as digital cameras, gaming terminal devices, music storage and playback appliances, a mobile phone, a cellular phone, a smart phone, voice over IP (VoIP) phones, wireless local loop phones, tablets, personal digital assistants (PDAs), wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

The terminal device may support device-to-device (D2D) communication, for example by implementing a 3GPP standard for sidelink communication, and may in this case be referred to as a D2D communication device.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink transmission refers to a transmission from the network device to a terminal device, and an uplink transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms. The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

Figure 1B:
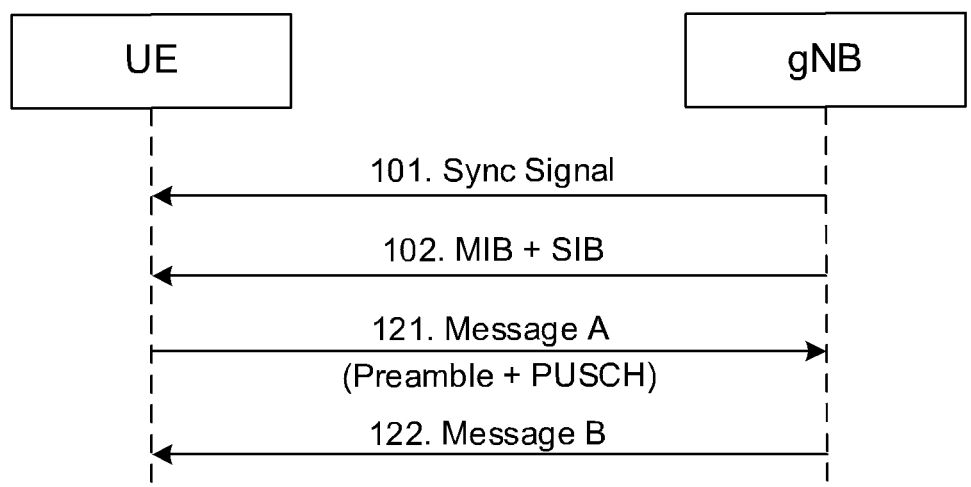
FIG. 1B is a sequence diagram showing a two-step random access procedure.

In the four-step random access procedure as shown in FIG. 1A, the DMRS configuration, e.g., the time domain resource and frequency domain resource for DMRS transmission, is determined based on the configuration information carried in Message 2. However, in the two-step random access procedure as shown in FIG. 1B, there is no Message 2 before the UE transmits the PUSCH (in Message A). In this case, it is desired to determine the DMRS configuration to be used for the PUSCH in the two-step random access procedure.

In NR, there are various configurations for DMRS.

For example, a DMRS can be a single-symbol signal or a double-symbol signal, and the latter is only used for dedicated PDSCH and PUSCH transmissions.

Further, there can be two types of frequency mappings of DMRS, referred to as Type 1 (or Code Division Multiplexing (CDM) group Type 1) and Type 2 (or CDM group Type 2), respectively. Type 1 is comb based, with 2 CDM groups. Type 2 is not comb based, with 3 CDM groups.

The time mapping of DMRS to symbols within a slot can be depend on a scheduling/mapping type of PUSCH, which is dynamically indicated in Downlink Control Information (DCI) that schedules the PUSCH. For PUSCH mapping Type A, which is slot based, a DMRS may start at Symbol 3 or 4 from a slot boundary, depending on a configuration indicated in Physical Broadcast Channel (PBCH). For PUSCH mapping Type B, which is a non-slot-based (or mini-slot based) scheduling, a DMRS may start in Symbol 1 of PUSCH. Also, one or more additional DMRS symbols could be configured within a PUSCH duration.

A number of DMRS ports can be configured. For example, up to 4 or 8 DMRS ports can be multiplexed for Type 1 and up to 6 or 12 ports can be multiplexed for Type 2, for single-symbol and double-symbol DMRSs respectively. Frequency Division Multiplexing (FDM), Frequency Division-Orthogonal Coverage Code (FD-OCC) and/or Time Division-Orthogonal Coverage Code (TD-OCC) can be used to separate orthogonal DMRS ports.

Furthermore, a DMRS, or DMRS sequence, can be generated as specified in Sections 6.4.1.1.1.1 and 6.4.1.1.1.2 of the 3$^{rd}$ Generation Partnership Project (3GPP) Technical Specification (TS) 38.211, V15.4.0, which is incorporated herein by reference in its entirety.

The DMRS configuration for Message 3 in the four-step random access procedure is also specified in TS 38.211. According to Section 2.1.3 of TS 38.211, for a PUSCH carrying Message 3, $N_{ID}^{nSCID}=N_{ID}^{cell}$ (for OFDM (Orthogonal Frequency Division Multiplexing)) or $n_{ID}^{RS}=N_{ID}^{cell}$ (for DFT-S-OFDM (Discrete Fourier Transform-Spread OFDM)) is applied for DMRS sequence generation in Sections 6.4.1.1.1.1 and 6.4.1.1.1.2, respectively. Type 1, single-symbol based DMRS is always used in the random access procedure since these are the default DMRS configurations prior to dedicated RRC configurations.

Table 6.4.1.1.3-3 in TS 38.211, reproduced below as Table 1, defines PUSCH DMRS positions within a slot for single-symbol DMRS, with intra-slot frequency hopping disabled.

TABLE 1

| $l_d$ in symbols | PUSCH mapping type A dmrs-AdditionalPosition | | | | PUSCH mapping type B dmrs-AdditionalPosition | | | |
|---|---|---|---|---|---|---|---|---|
| | 0 | 1 | 2 | 3 | 0 | 1 | 2 | 3 |
| <4 | — | — | — | — | $l_0$ | $l_0$ | $l_0$ | $l_0$ |
| 4 | $l_0$ | $l_0$ | $l_0$ | $l_0$ | $l_0$ | $l_0$ | $l_0$ | $l_0$ |
| 5 | $l_0$ | $l_0$ | $l_0$ | $l_0$ | $l_0$ | $l_0$, 4 | $l_0$, 4 | $l_0$, 4 |
| 6 | $l_0$ | $l_0$ | $l_0$ | $l_0$ | $l_0$ | $l_0$, 4 | $l_0$, 4 | $l_0$, 4 |
| 7 | $l_0$ | $l_0$ | $l_0$ | $l_0$ | $l_0$ | $l_0$, 4 | $l_0$, 4 | $l_0$, 4 |
| 8 | $l_0$ | $l_0$, 7 | $l_0$, 7 | $l_0$, 7 | $l_0$ | $l_0$, 6 | $l_0$, 3, 6 | $l_0$, 3, 6 |
| 9 | $l_0$ | $l_0$, 7 | $l_0$, 7 | $l_0$, 7 | $l_0$ | $l_0$, 6 | $l_0$, 3, 6 | $l_0$, 3, 6 |
| 10 | $l_0$ | $l_0$, 9 | $l_0$, 6, 9 | $l_0$, 6, 9 | $l_0$ | $l_0$, 8 | $l_0$, 4, 8 | $l_0$, 3, 6, 9 |
| 11 | $l_0$ | $l_0$, 9 | $l_0$, 6, 9 | $l_0$, 6, 9 | $l_0$ | $l_0$, 8 | $l_0$, 4, 8 | $l_0$, 3, 6, 9 |
| 12 | $l_0$ | $l_0$, 9 | $l_0$, 6, 9 | $l_0$, 5, 8, 11 | $l_0$ | $l_0$, 10 | $l_0$, 5, 10 | $l_0$, 3, 6, 9 |
| 13 | $l_0$ | $l_0$, 11 | $l_0$, 7, 11 | $l_0$, 5, 8, 11 | $l_0$ | $l_0$, 10 | $l_0$, 5, 10 | $l_0$, 3, 6, 9 |
| 14 | $l_0$ | $l_0$, 11 | $l_0$, 7, 11 | $l_0$, 5, 8, 11 | $l_0$ | $l_0$, 10 | $l_0$, 5, 10 | $l_0$, 3, 6, 9 |

Table 6.4.1.1.3-4 in TS 38.211, reproduced below as Table 2, defines PUSCH DMRS positions within a slot for double-symbol DMRS, with intra-slot frequency hopping disabled.

TABLE 2

| $l_d$ in symbols | PUSCH mapping type A dmrs-AdditionalPosition | | | | PUSCH mapping type B dmrs-AdditionalPosition | | | |
|---|---|---|---|---|---|---|---|---|
| | 0 | 1 | 2 | 3 | 0 | 1 | 2 | 3 |
| <4 | — | — | | | — | — | | |
| 4 | $l_0$ | $l_0$ | | | — | — | | |
| 5 | $l_0$ | $l_0$ | | | $l_0$ | $l_0$ | | |
| 6 | $l_0$ | $l_0$ | | | $l_0$ | $l_0$ | | |
| 7 | $l_0$ | $l_0$ | | | $l_0$ | $l_0$ | | |
| 8 | $l_0$ | $l_0$ | | | $l_0$ | $l_0$, 5 | | |
| 9 | $l_0$ | $l_0$ | | | $l_0$ | $l_0$, 5 | | |
| 10 | $l_0$ | $l_0$, 8 | | | $l_0$ | $l_0$, 7 | | |
| 11 | $l_0$ | $l_0$, 8 | | | $l_0$ | $l_0$, 7 | | |
| 12 | $l_0$ | $l_0$, 8 | | | $l_0$ | $l_0$, 9 | | |
| 13 | $l_0$ | $l_0$, 10 | | | $l_0$ | $l_0$, 9 | | |
| 14 | $l_0$ | $l_0$, 10 | | | $l_0$ | $l_0$, 9 | | |

Table 6.4.1.1.3-6 in TS 38.211, reproduced below as Table 3, defines PUSCH DMRS positions within a slot for single-symbol DMRS, with intra-slot frequency hopping enabled.

TABLE 3

| | PUSCH mapping type A | | | | | | PUSCH mapping type B | | | |
|---|---|---|---|---|---|---|---|---|---|---|
| | $l_0 = 2$ dmrs-AdditionalPosition | | | | $l_0 = 3$ dmrs-AdditionalPosition | | | | $l_0 = 0$ dmrs-AdditonalPosition | |
| | 0 | | 1 | | 0 | | 1 | | 0 | 1 |
| $l_d$ in symbols | 1st hop | 2nd hop | 1st hop | 2nd hop | 1st hop | 2nd hop | 1st hop | 2nd hop | 1st hop | 2nd hop |
| <3 | — | — | — | — | — | — | — | — | 0 | 0 |
| 4 | 2 | 0 | 2 | 0 | 3 | 0 | 3 | 0 | 0 | 0 |

TABLE 3-continued

| | DM-RS positions $\bar{l}$ | | | | | | | | | | | | |
|---|---|---|---|---|---|---|---|---|---|---|---|---|---|
| | PUSCH mapping type A | | | | | | | | PUSCH mapping type B | | | | |
| | $l_0 = 2$ dmrs-AdditionalPosition | | | | $l_0 = 3$ dmrs-AdditionalPosition | | | | $l_0 = 0$ dmrs-AdditonalPosition | | | | |
| | 0 | | 1 | | 0 | | 1 | | 0 | | 1 | | |
| $l_d$ in symbols | 1st hop | 2nd hop | 1st hop | 2nd hop | 1st hop | 2nd hop | 1st hop | 2nd hop | 1st hop | 2nd hop | 1st hop | 2nd hop |
| 5, 6 | 2 | 0 | 2 | 0, 4 | 3 | 0 | 3 | 0, 4 | 0 | 0 | 0, 4 | 0, 4 |
| 7 | 2 | 0 | 2, 6 | 0, 4 | 3 | 0 | 3 | 0, 4 | 0 | 0 | 0, 4 | 0, 4 |

For details of Tables 1-3, reference can be made to Section 6.4.1.1.3 in TS 38.211 and description thereof will be omitted here.

For PUSCH mapping Type A, one front loaded DMRS symbol plus two additional DMRS symbols can be the default DMRS configuration for the random access procedure. For PUSCH mapping Type B with frequency hopping disabled, Type B, up to two additional DMRS symbols (dmrs-AdditionalPosition=2) can be the default configuration for the random access procedure.

A list of applicable PUSCH durations scheduled by a RAR is given in Section 6.1.2.1.1 in 3GPP TS 38.214, V15.4.0, which is incorporated herein by reference in its entirety. In particular, Table 6.1.2.1.1-2 in TS 38.214, reproduced below as Table 4, gives a default PUSCH time domain resource allocation A for normal Cyclic Prefix (CP), and Table 6.1.2.1.1-3 in TS 38.214, reproduced below as Table 5, gives a default PUSCH time domain resource allocation A for extended CP.

TABLE 4

| Row index | PUSCH mapping type | $K_2$ | S | L |
|---|---|---|---|---|
| 1 | Type A | j | 0 | 14 |
| 2 | Type A | j | 0 | 12 |
| 3 | Type A | j | 0 | 10 |
| 4 | Type B | j | 2 | 10 |
| 5 | Type B | j | 4 | 10 |
| 6 | Type B | j | 4 | 8 |
| 7 | Type B | j | 4 | 6 |
| 8 | Type A | j + 1 | 0 | 14 |
| 9 | Type A | j + 1 | 0 | 12 |
| 10 | Type A | j + 1 | 0 | 10 |
| 11 | Type A | j + 2 | 0 | 14 |
| 12 | Type A | j + 2 | 0 | 12 |
| 13 | Type A | j + 2 | 0 | 10 |
| 14 | Type B | j | 8 | 6 |
| 15 | Type A | j + 3 | 0 | 14 |
| 16 | Type A | j + 3 | 0 | 10 |

TABLE 5

| Row index | PUSCH mapping type | $K_2$ | S | L |
|---|---|---|---|---|
| 1 | Type A | j | 0 | 8 |
| 2 | Type A | j | 0 | 12 |
| 3 | Type A | j | 0 | 10 |
| 4 | Type B | j | 2 | 10 |
| 5 | Type B | j | 4 | 4 |
| 6 | Type B | j | 4 | 8 |
| 7 | Type B | j | 4 | 6 |
| 8 | Type A | j + 1 | 0 | 8 |
| 9 | Type A | j + 1 | 0 | 12 |
| 10 | Type A | j + 1 | 0 | 10 |
| 11 | Type A | j + 2 | 0 | 6 |
| 12 | Type A | j + 2 | 0 | 12 |
| 13 | Type A | j + 2 | 0 | 10 |
| 14 | Type B | j | 8 | 4 |
| 15 | Type A | j + 3 | 0 | 8 |
| 16 | Type A | j + 3 | 0 | 10 |

Figure 2:
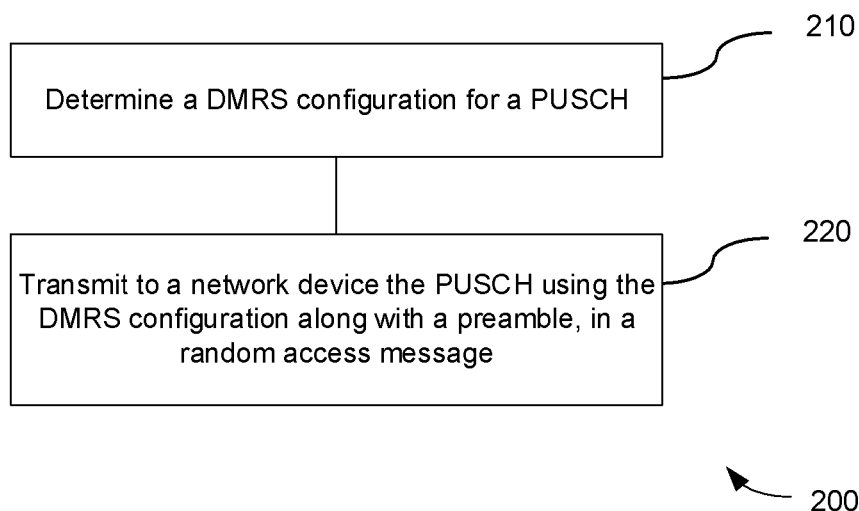
FIG. 2 is a flowchart illustrating a method in a terminal device according to an embodiment of the present disclosure.

FIG. 2 is a flowchart illustrating a method 200 according to an embodiment of the present disclosure. The method 200 can be performed in a terminal device, e.g., a UE.

At block 210, a DMRS configuration for a PUSCH is determined.

In an example, the DMRS configuration may be determined based on one or more of the following configuration parameters:
 a frequency hopping configuration (i.e., enabled or disabled),
 a PUSCH mapping type (i.e., Type A or Type B),
 a PUSCH duration (i.e., the number of OFDM symbols for PUSCH),
 a number of symbols for the DMRS (i.e., single-symbol or double-symbol),
 a maximum number of additional DMRS symbols (i.e., dmrs-AdditionalPosition), or
 a CDM group type (Type 1 or Type 2).

In an example, the DMRS configuration may include a time domain resource for DMRS. In the block 210, the time domain resource for DMRS can be determined based on one or more of the following configuration parameters:
 a frequency hopping configuration (i.e., enabled or disabled),
 a PUSCH mapping type (i.e., Type A or Type B),
 a PUSCH duration (i.e., the number of OFDM symbols for PUSCH),
 a number of symbols for the DMRS (i.e., single-symbol or double-symbol),
 a maximum number of additional DMRS symbols (i.e., dmrs-AdditionalPosition), or
 a CDM group type (Type 1 or Type 2).

For example, one or more of these configuration parameters can be predetermined by default. As an example, by default, the frequency hopping can be disabled, the PUSCH mapping type can be Type A, the PUSCH duration can be a fixed value, the number of symbols for DMRS can be one, the maximum number of additional DMRS symbols can be a fixed value (e.g., dmrs-AdditionalPosition=2), and the CDM group type can be Type 1.

Alternatively, one or more of these configuration parameters can be determined based on a resource and/or sequence for the preamble. For example, there can be a predetermined mapping between the configuration parameters and the resource and/or sequence for the preamble, and the configuration parameters can be determined based on the predetermined mapping.

Alternatively, one or more of these configuration parameters can be received from the network device via signaling. For example, the signaling may include RRC signaling or Layer 1 signaling. The RRC signaling may include a system information message and/or a dedicated signaling message, and the Layer 1 signaling may include DCI.

In an example, the maximum number of additional DMRS symbols can be determined based on a moving speed of the terminal device. For example, when the moving speed of the terminal device is lower than a threshold (e.g., 120 km), dmrs-AdditionalPosition=1; or otherwise dmrs-AdditionalPosition=2.

In an example, the time domain resource for DMRS can be determined based on a predetermined mapping between the time domain resource for DRMS and one or more of the above configuration parameters. For example, Tables 1-5 as described above can be reused. The time domain resource for DMRS can be determined by looking up these tables based on the configuration parameters.

Further, the DMRS configuration may include a DMRS port and/or a DMRS sequence. In the block 210, the DMRS port and/or the DMRS sequence can be determined based on a resource and/or sequence for the preamble and/or on a resource for the PUSCH.

For example, one DMRS port (and/or one DMRS sequence) can be mapped to the resource and/or sequence for the preamble and/or to the resource for the PUSCH. The DMRS port can be determined as a DMRS port that is mapped to the resource and/or sequence for the preamble and/or to the resource for the PUSCH. The DMRS sequence can be determined as a DMRS sequence that is mapped to the resource and/or sequence for the preamble and/or to the resource for the PUSCH. Alternatively, a set of DMRS ports (and/or DMRS sequences) can be mapped to the resource and/or sequence for the preamble and/or to the resource for the PUSCH. The DMRS port can be selected randomly from the set of DMRS ports that are mapped to the resource and/or sequence for the preamble and/or to the resource for the PUSCH. The DMRS sequence can be selected randomly from the set of DMRS sequences that are mapped to the resource and/or sequence for the preamble and/or to the resource for the PUSCH. Such random selection of the DMRS port and/or the DMRS sequence reduces the probability of collision between DMRSs from different terminal devices.

In an example, the DMRS sequence can be generated by using an identifier of the preamble as an initialization parameter. In this way, the probability of collision between DMRSs from different terminal devices can be reduced. For example, in the DMRS sequence generation as specified in Section 6.4.1.1.1.1 of TS 38.211, the pseudo-random sequence generator may be initialized with $$c_{init}=(2^{17}(N_{symb}^{slot}n_{s,f}^{\mu}+l+1)(2N_{ID}^{nSCID}+1)+2N_{ID}^{nSCID}+n_{SCID}+\text{PreambleID})\bmod 2^{31},$$

where PreambleID denotes the identifier of the preamble. Alternatively, in the DMRS sequence generation as specified in Section 6.4.1.1.1.2 of TS 38.211, $f_{gh}$ can be a function of a cell identifier and the identifier of the preamble. For example, $f_{gh}$ or the sequence number v can be given by:

$$f_{gh}=(f_{gh}+\text{preambleID})\bmod 30, \text{ or } v=(v+\text{preambleID})\bmod 30,$$

where PreambleID denotes the identifier of the preamble.

At block 220, the PUSCH using the DMRS configuration is transmitted, along with a preamble, in a random access message to a network device (e.g., a gNB).

Here, the random access message can be a message in a two-step random access procedure, e.g., Message A in FIG. 1B.

In an example, the preamble can be selected from a set of preambles reserved for two-step random access only, or the PUSCH can be transmitted over a time-frequency resource selected from a set of time-frequency resources reserved for two-step random access only. This allows the network device to determine that the preamble is a part of a Message A in a two-step random access and then attempt to detect the PUSCH in the Message A.

Figure 3:
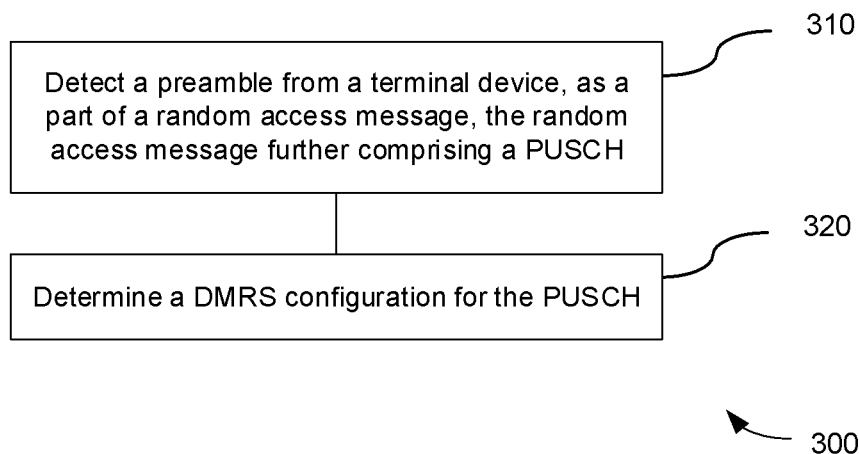
FIG. 3 is a flowchart illustrating a method in a network device according to another embodiment of the present disclosure.

FIG. 3 is a flowchart illustrating a method 300 according to an embodiment of the present disclosure. The method 300 can be performed in a network device, e.g., a gNB.

At block 310, a preamble from a terminal device (e.g., a UE) is determined, as a part of a random access message. The random access message further includes a PUSCH. Here, the random access message can be a message in a two-step random access procedure, e.g., Message A in FIG. 1B.

In an example, in the block 310, it can be determined that the preamble is selected from a set of preambles reserved for two-step random access only, or that the PUSCH is transmitted over a time-frequency resource selected from a set of time-frequency resources reserved for two-step random access only.

At block 320, a DMRS configuration for the PUSCH is determined.

In an example, the DMRS configuration may be determined based on one or more of the following configuration parameters:
  a frequency hopping configuration (i.e., enabled or disabled),
  a PUSCH mapping type (i.e., Type A or Type B),
  a PUSCH duration (i.e., the number of OFDM symbols for PUSCH),
  a number of symbols for the DMRS (i.e., single-symbol or double-symbol),
  a maximum number of additional DMRS symbols (i.e., dmrs-AdditionalPosition), or
  a CDM group type (Type 1 or Type 2).

In particular, in an example, the DMRS configuration may include a time domain resource for DMRS. In the block 320, the time domain resource for DMRS can be determined based on one or more of the following configuration parameters:
  a frequency hopping configuration (i.e., enabled or disabled),
  a PUSCH mapping type (i.e., Type A or Type B),
  a PUSCH duration (i.e., the number of OFDM symbols for PUSCH),
  a number of symbols for the DMRS (i.e., single-symbol or double-symbol),
  a maximum number of additional DMRS symbols (i.e., dmrs-AdditionalPosition), or
  a CDM group type (Type 1 or Type 2).

For example, one or more of these configuration parameters can be predetermined by default or can be determined based on a resource and/or sequence for the preamble.

In an example, one or more of these configuration parameters can be transmitted to the terminal device via signaling. For example, the signaling may include RRC signaling or Layer 1 signaling. The RRC signaling may include a system information message and/or a dedicated signaling message, and the Layer 1 signaling may include DCI.

In an example, the maximum number of additional DMRS symbols can be determined based on a moving speed of the terminal device.

In an example, the time domain resource for DMRS can be determined based on a predetermined mapping between the time domain resource for DRMS and one or more of the above configuration parameters. For example, Tables 1-5 as described above can be reused. The time domain resource for DMRS can be determined by looking up these tables based on the configuration parameters.

Further, the DMRS configuration may include a DMRS port and/or a DMRS sequence. In the block 320, the DMRS port and/or the DMRS sequence can be determined based on a resource and/or sequence for the preamble and/or on a resource for the PUSCH. For example, the DMRS port can be determined as a DMRS port that is mapped to the resource and/or sequence for the preamble and/or to the resource for the PUSCH, and/or the DMRS sequence can be determined as a DMRS sequence that is mapped to the resource and/or sequence for the preamble and/or to the resource for the PUSCH. Alternatively, the DMRS port can be selected randomly from a set of DMRS ports that are mapped to the resource and/or sequence for the preamble and/or to the resource for the PUSCH, and/or the DMRS sequence can be selected randomly from a set of DMRS sequences that are mapped to the resource and/or sequence for the preamble and/or to the resource for the PUSCH.

In an example, the DMRS sequence can be generated by using an identifier of the preamble as an initialization parameter.

The operation in the block 320 corresponds to the operation in the block 210 performed at the terminal device. Thus, for further details of the operation in the block 320, reference can be made to the block 210 as described above.

In an example, the method 300 can further include a step of demodulating the PUSCH based on the DMRS configuration. In particular, the network device can detect the DMRS based on the DMRS configuration, estimate an uplink channel based on the DMRS and then demodulate the PUSCH based on the estimated channel.

Figure 4:
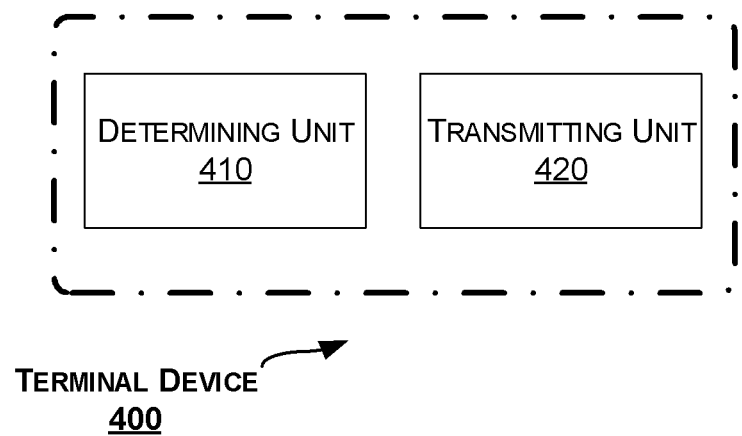
FIG. 4 is a block diagram of a terminal node according to an embodiment of the present disclosure.

Correspondingly to the method 200 as described above, a terminal device is provided. FIG. 4 is a block diagram of a terminal device 400 according to an embodiment of the present disclosure.

As shown in FIG. 4, the terminal device 400 includes a determining unit 410 configured to determine a DMRS configuration for a PUSCH. The terminal device 400 further includes a transmitting unit 420 configured to transmit to a network device the PUSCH using the DMRS configuration along with a preamble, in a random access message.

In an embodiment, the determining unit 410 can be configured to determine the time domain resource for DMRS based on one or more of: a frequency hopping configuration, a PUSCH mapping type, a PUSCH duration, a number of symbols for the DMRS, a maximum number of additional DMRS symbols, or a CDM group type.

In an embodiment, the DMRS configuration may include a time domain resource for DMRS. The determining unit 410 can be configured to determine the time domain resource for DMRS based on one or more of: a frequency hopping configuration, a PUSCH mapping type, a PUSCH duration, a number of symbols for the DMRS, a maximum number of additional DMRS symbols, or a CDM group type.

In an embodiment, the one or more of the frequency hopping configuration, the PUSCH mapping type, the PUSCH duration, the number of symbols for DMRS, the maximum number of additional DMRS symbols or the CDM group type may be predetermined by default or determined based on a resource and/or sequence for the preamble.

In an embodiment, the one or more of the frequency hopping configuration, the PUSCH mapping type, the PUSCH duration, the number of symbols for DMRS, the maximum number of additional DMRS symbols or the CDM group type may be received from the network device via signaling.

In an embodiment, the signaling may include RRC signaling or Layer 1 signaling. The RRC signaling may include a system information message and/or a dedicated signaling message, and the Layer 1 signaling may include DCI.

In an embodiment, the maximum number of additional DMRS symbols may be determined based on a moving speed of the terminal device.

In an embodiment, the time domain resource for DMRS may be determined based on a predetermined mapping between the time domain resource for DRMS and the one or more of the frequency hopping configuration, the PUSCH mapping type, the PUSCH duration, the number of symbols for DMRS, the maximum number of additional DMRS symbols or the CDM group type.

In an embodiment, the DMRS configuration may include a DMRS port and/or a DMRS sequence. The determining unit 410 can be configured to determine the DMRS port and/or the DMRS sequence based on a resource and/or sequence for the preamble and/or on a resource for the PUSCH.

In an embodiment, the determining unit 410 can be configured to determine the DMRS port as a DMRS port that is mapped to the resource and/or sequence for the preamble and/or to the resource for the PUSCH, and/or determine the DMRS sequence as a DMRS sequence that is mapped to the resource and/or sequence for the preamble and/or to the resource for the PUSCH. Alternatively, the determining unit 410 can be configured to select the DMRS port randomly from a set of DMRS ports that are mapped to the resource and/or sequence for the preamble and/or to the resource for the PUSCH, and/or select the DMRS sequence randomly from a set of DMRS sequences that are mapped to the resource and/or sequence for the preamble and/or to the resource for the PUSCH.

In an embodiment, the determining unit 410 can be configured to generate the DMRS sequence by using an identifier of the preamble as an initialization parameter.

In an embodiment, the random access message may be a message in a two-step random access procedure.

In an embodiment, the preamble may be selected from a set of preambles reserved for two-step random access only, or the PUSCH may be transmitted over a time-frequency resource selected from a set of time-frequency resources reserved for two-step random access only.

The units 410 and 420 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 2.

Figure 5:
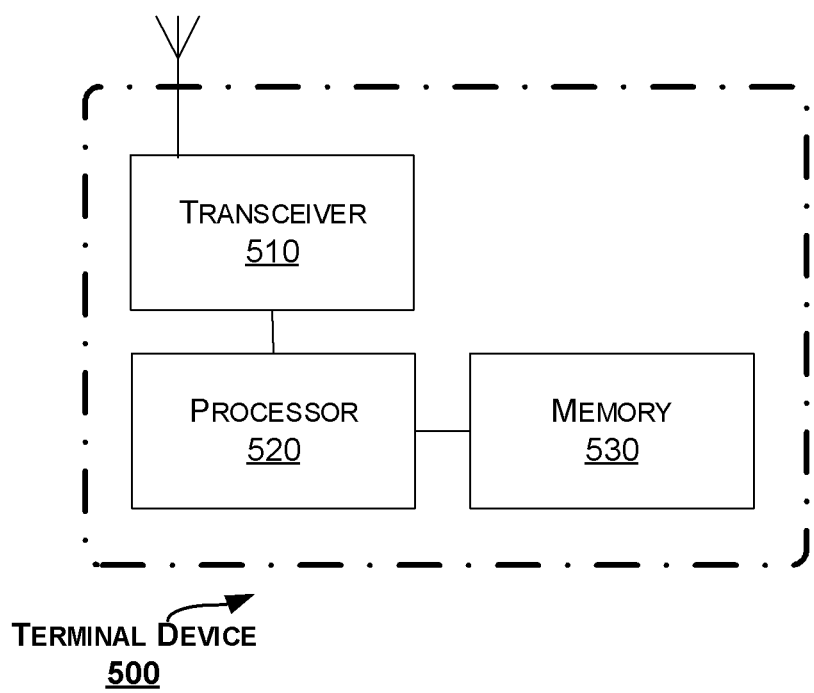
FIG. 5 is a block diagram of a terminal node according to another embodiment of the present disclosure.

FIG. 5 is a block diagram of a terminal device 500 according to another embodiment of the present disclosure.

The terminal device 500 includes a transceiver 510, a processor 520 and a memory 530. The memory 530 contains instructions executable by the processor 520 whereby the terminal device 500 is operative to perform the actions, e.g., of the procedure described earlier in conjunction with FIG. 2. Particularly, the memory 530 contains instructions executable by the processor 520 whereby the terminal device 500 is operative to: determine a DMRS configuration for a PUSCH; and transmit to a network device the PUSCH using the DMRS configuration along with a preamble, in a random access message.

In an embodiment, the operation of determining the DMRS configuration may be based on one or more of: a frequency hopping configuration, a PUSCH mapping type, a PUSCH duration, a number of symbols for the DMRS, a maximum number of additional DMRS symbols, or a CDM group type.

In an embodiment, the DMRS configuration may include a time domain resource for DMRS. The operation of determining the DMRS configuration may include determining the time domain resource for DMRS based on one or more of: a frequency hopping configuration, a PUSCH mapping type, a PUSCH duration, a number of symbols for the DMRS, a maximum number of additional DMRS symbols, or a Code Division Multiplexing (CDM) group type.

In an embodiment, the one or more of the frequency hopping configuration, the PUSCH mapping type, the PUSCH duration, the number of symbols for DMRS, the maximum number of additional DMRS symbols or the CDM group type may be predetermined by default or determined based on a resource and/or sequence for the preamble.

In an embodiment, the one or more of the frequency hopping configuration, the PUSCH mapping type, the PUSCH duration, the number of symbols for DMRS, the maximum number of additional DMRS symbols or the CDM group type may be received from the network device via signaling.

In an embodiment, the signaling may include Radio Resource Control (RRC) signaling or Layer 1 signaling. The RRC signaling may include a system information message and/or a dedicated signaling message, and the Layer 1 signaling may include Downlink Control Information (DCI).

In an embodiment, the maximum number of additional DMRS symbols may be determined based on a moving speed of the terminal device.

In an embodiment, the time domain resource for DMRS may be determined based on a predetermined mapping between the time domain resource for DRMS and the one or more of the frequency hopping configuration, the PUSCH mapping type, the PUSCH duration, the number of symbols for DMRS, the maximum number of additional DMRS symbols or the CDM group type.

In an embodiment, the DMRS configuration may include a DMRS port and/or a DMRS sequence. The operation of determining the DMRS configuration may include determining the DMRS port and/or the DMRS sequence based on a resource and/or sequence for the preamble and/or on a resource for the PUSCH.

In an embodiment, the operation of determining the DMRS port and/or the DMRS sequence may include: determining the DMRS port as a DMRS port that is mapped to the resource and/or sequence for the preamble and/or to the resource for the PUSCH, and/or determining the DMRS sequence as a DMRS sequence that is mapped to the resource and/or sequence for the preamble and/or to the resource for the PUSCH. Alternatively, the operation of determining the DMRS port and/or the DMRS sequence may include: selecting the DMRS port randomly from a set of DMRS ports that are mapped to the resource and/or sequence for the preamble and/or to the resource for the PUSCH, and/or selecting the DMRS sequence randomly from a set of DMRS sequences that are mapped to the resource and/or sequence for the preamble and/or to the resource for the PUSCH.

In an embodiment, the operation of determining the DMRS sequence may include: generating the DMRS sequence by using an identifier of the preamble as an initialization parameter.

In an embodiment, the random access message may be a message in a two-step random access procedure.

In an embodiment, the preamble may be selected from a set of preambles reserved for two-step random access only, or the PUSCH may be transmitted over a time-frequency resource selected from a set of time-frequency resources reserved for two-step random access only.

Figure 6:
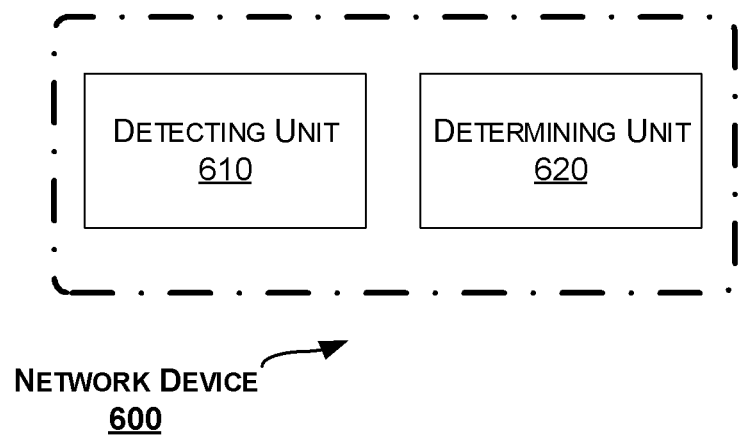
FIG. 6 is a block diagram of a network node according to another embodiment of the present disclosure.

Correspondingly to the method 300 as described above, a network device is provided. FIG. 6 is a block diagram of a network device 600 according to an embodiment of the present disclosure.

As shown in FIG. 6, the network device 600 includes a detecting unit 610 configured to detect a preamble from a terminal device, as a part of a random access message the random access message further including a PUSCH. The network device 600 further includes a determining unit 620 configured to determine a DMRS configuration for the PUSCH.

In an embodiment, the determining unit 620 can be configured to determine the time domain resource for DMRS based on one or more of: a frequency hopping configuration, a PUSCH mapping type, a PUSCH duration, a number of symbols for the DMRS, a maximum number of additional DMRS symbols, or a CDM group type.

In an embodiment, the DMRS configuration may include a time domain resource for DMRS. The determining unit 620 can be configured to determine the time domain resource for DMRS based on one or more of: a frequency hopping configuration, a PUSCH mapping type, a PUSCH duration, a number of symbols for the DMRS, a maximum number of additional DMRS symbols, or a CDM group type.

In an embodiment, the one or more of the frequency hopping configuration, the PUSCH mapping type, the PUSCH duration, the number of symbols for DMRS, the maximum number of additional DMRS symbols or the CDM group type may be predetermined by default or determined based on a resource and/or sequence for the preamble.

In an embodiment, the network device 600 may further include a transmitting unit configured to transmit the one or more of the frequency hopping configuration, the PUSCH mapping type, the PUSCH duration, the number of symbols for DMRS, the maximum number of additional DMRS symbols or the CDM group type to the terminal device via signaling.

In an embodiment, the signaling may include RRC signaling or Layer 1 signaling. The RRC signaling may include a system information message and/or a dedicated signaling message, and the Layer 1 signaling may include DCI.

In an embodiment, the maximum number of additional DMRS symbols may be determined based on a moving speed of the terminal device.

In an embodiment, the time domain resource for DMRS may be determined based on a predetermined mapping between the time domain resource for DRMS and the one or more of the frequency hopping configuration, the PUSCH mapping type, the PUSCH duration, the number of symbols for DMRS, the maximum number of additional DMRS symbols or the CDM group type.

In an embodiment, the DMRS configuration may include a DMRS port and/or a DMRS sequence. The determining unit 620 can be configured to determine the DMRS port and/or the DMRS sequence based on a resource and/or sequence for the preamble and/or on a resource for the PUSCH.

In an embodiment, the determining unit 620 can be configured to determine the DMRS port as a DMRS port that is mapped to the resource and/or sequence for the preamble and/or to the resource for the PUSCH, and/or determine the DMRS sequence as a DMRS sequence that is mapped to the resource and/or sequence for the preamble and/or to the resource for the PUSCH. Alternatively, the determining unit 620 can be configured to determine the DMRS port randomly from a set of DMRS ports that are mapped to the resource and/or sequence for the preamble and/or to the resource for the PUSCH, and/or determine the DMRS sequence randomly from a set of DMRS sequences that are mapped to the resource and/or sequence for the preamble and/or to the resource for the PUSCH.

In an embodiment, the determining unit 620 can be configured to generate the DMRS sequence by using an identifier of the preamble as an initialization parameter.

In an embodiment, the random access message may be a message in a two-step random access procedure. The detecting unit 610 can be configured to determine that the preamble is selected from a set of preambles reserved for two-step random access only, or that the PUSCH is transmitted over a time-frequency resource selected from a set of time-frequency resources reserved for two-step random access only.

In an embodiment, the network device 600 may further include a demodulating unit configured to demodulate the PUSCH based on the DMRS configuration.

The units 610 and 620 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 3.

Figure 7:
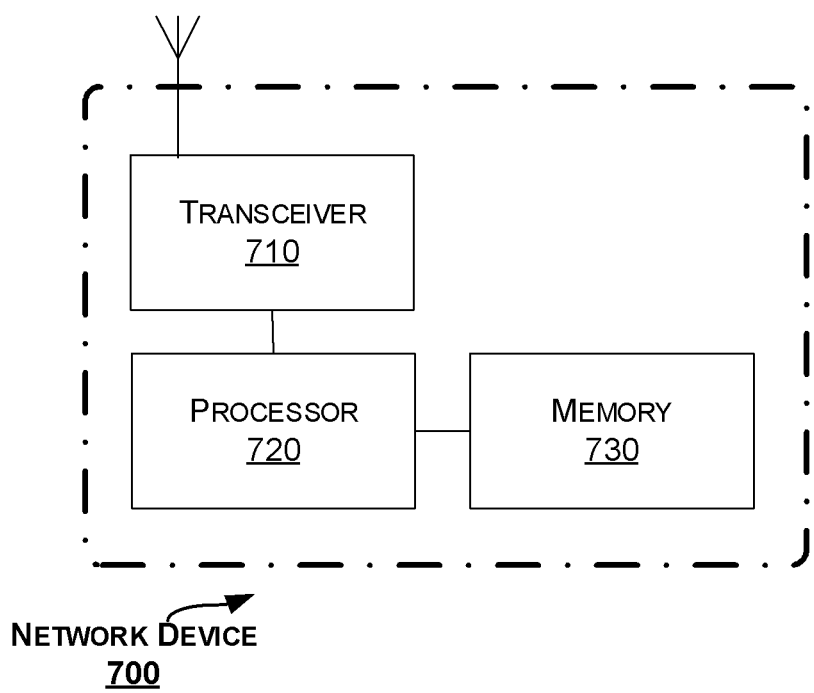
FIG. 7 is a block diagram of a network node according to another embodiment of the present disclosure.

FIG. 7 is a block diagram of a network device 700 according to another embodiment of the present disclosure.

The network device 700 includes a transceiver 710, a processor 720 and a memory 730. The memory 730 contains instructions executable by the processor 720 whereby the network device 700 is operative to perform the actions, e.g., of the procedure described earlier in conjunction with FIG. 3. Particularly, the memory 730 contains instructions executable by the processor 720 whereby the network device 700 is operative to detect a preamble from a terminal device, as a part of a random access message, the random access message further including a PUSCH; and determine a DMRS configuration for the PUSCH.

In an embodiment, the operation of determining the DMRS configuration may be based on one or more of: a frequency hopping configuration, a PUSCH mapping type, a PUSCH duration, a number of symbols for the DMRS, a maximum number of additional DMRS symbols, or a CDM group type.

In an embodiment, the DMRS configuration may include a time domain resource for DMRS. The operation of determining the DMRS configuration may include determining the time domain resource for DMRS based on one or more of: a frequency hopping configuration, a PUSCH mapping type, a PUSCH duration, a number of symbols for the DMRS, a maximum number of additional DMRS symbols, or a CDM group type.

In an embodiment, the one or more of the frequency hopping configuration, the PUSCH mapping type, the PUSCH duration, the number of symbols for DMRS, the maximum number of additional DMRS symbols or the CDM group type may be predetermined by default or determined based on a resource and/or sequence for the preamble.

In an embodiment, the memory 730 may further contain instructions executable by the processor 720 whereby the network device 700 is operative to transmit the one or more of the frequency hopping configuration, the PUSCH mapping type, the PUSCH duration, the number of symbols for DMRS, the maximum number of additional DMRS symbols or the CDM group type to the terminal device via signaling.

In an embodiment, the signaling may include RRC signaling or Layer 1 signaling. The RRC signaling may include a system information message and/or a dedicated signaling message, and the Layer 1 signaling may include DCI.

In an embodiment, the maximum number of additional DMRS symbols may be determined based on a moving speed of the terminal device.

In an embodiment, the time domain resource for DMRS may be determined based on a predetermined mapping between the time domain resource for DRMS and the one or more of the frequency hopping configuration, the PUSCH mapping type, the PUSCH duration, the number of symbols for DMRS, the maximum number of additional DMRS symbols or the CDM group type.

In an embodiment, the DMRS configuration may include a DMRS port and/or a DMRS sequence. The operation of determining the DMRS configuration may include determining the DMRS port and/or the DMRS sequence based on a resource and/or sequence for the preamble and/or on a resource for the PUSCH.

In an embodiment, the operation of determining the DMRS port and/or the DMRS sequence may include: determining the DMRS port as a DMRS port that is mapped to the resource and/or sequence for the preamble and/or to the resource for the PUSCH, and/or determining the DMRS sequence as a DMRS sequence that is mapped to the resource and/or sequence for the preamble and/or to the resource for the PUSCH. Alternatively, the operation of determining the DMRS port and/or the DMRS sequence may include: determining the DMRS port randomly from a set of DMRS ports that are mapped to the resource and/or sequence for the preamble and/or to the resource for the PUSCH, and/or determining the DMRS sequence randomly from a set of DMRS sequences that are mapped to the resource and/or sequence for the preamble and/or to the resource for the PUSCH.

In an embodiment, the operation of determining the DMRS sequence may include: generating the DMRS sequence by using an identifier of the preamble as an initialization parameter.

In an embodiment, the random access message may be a message in a two-step random access procedure. The operation of detecting the preamble as a part of the random access message may include: determining that the preamble is selected from a set of preambles reserved for two-step random access only, or that the PUSCH is transmitted over a time-frequency resource selected from a set of time-frequency resources reserved for two-step random access only.

In an embodiment, the memory 730 may further contain instructions executable by the processor 720 whereby the network device 700 is operative to demodulate the PUSCH based on the DMRS configuration.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 520 causes the terminal device 500 to perform the actions, e.g., of the procedure described earlier in conjunction with FIG. 2; or code/computer readable instructions, which when executed by the processor 720 causes the network device 700 to perform the actions, e.g., of the procedure described earlier in conjunction with FIG. 3.

The computer program product may be configured as a computer program code structured in computer program modules. The computer program modules could essentially perform the actions of the flow illustrated in FIG. 2 or 3.

The processor may be a single CPU (Central Processing Unit), but could also comprise two or more processing units. For example, the processor may include general purpose microprocessors; instruction set processors and/or related chips sets and/or special purpose microprocessors such as Application Specific Integrated Circuits (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random Access Memory (RAM), a Read-Only Memory (ROM), or an EEPROM, and the computer program modules described above could in alternative embodiments be distributed on different computer program products in the form of memories.

Figure 8:
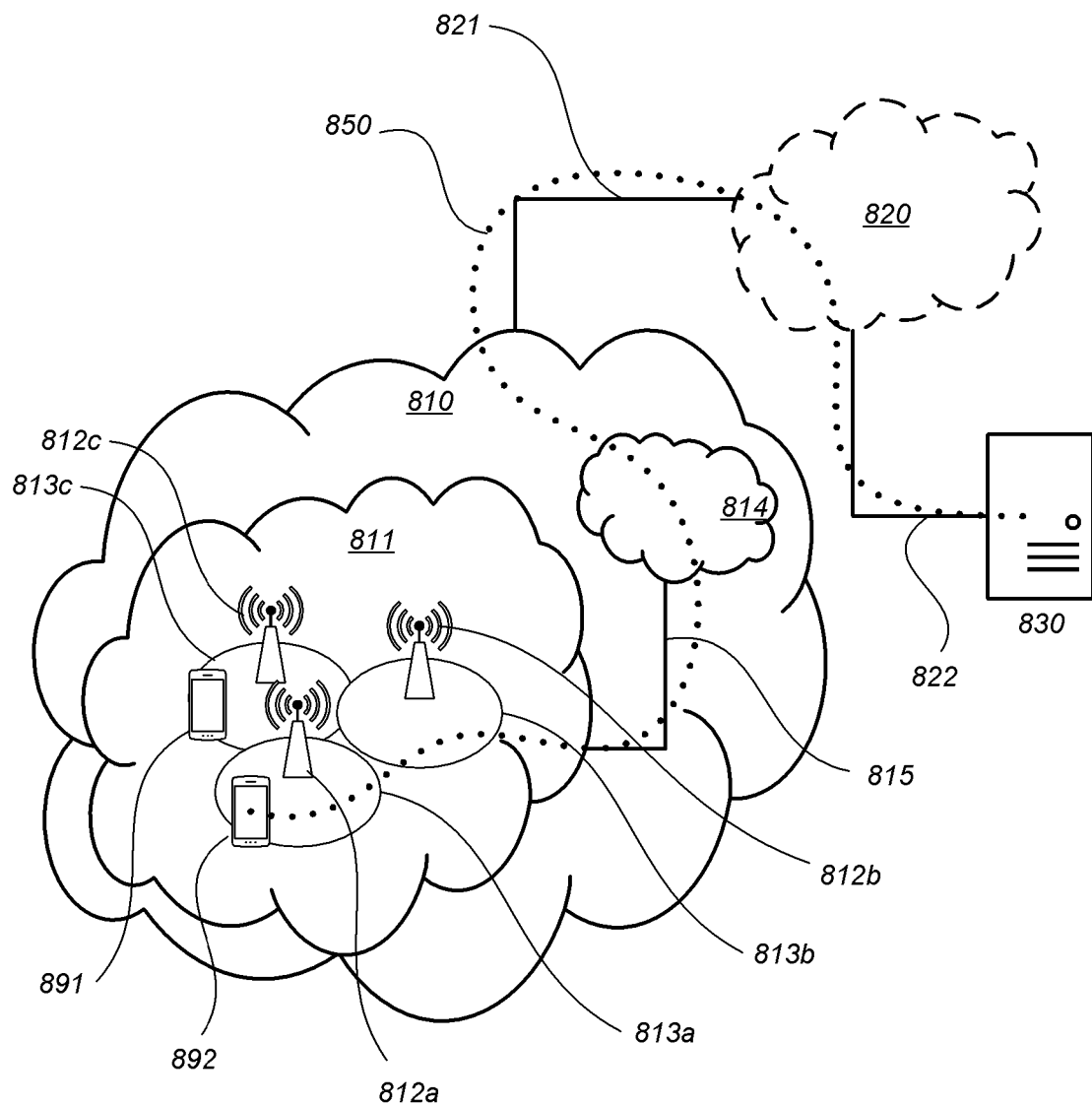
FIG. 8 schematically illustrates a telecommunication network connected via an intermediate network to a host computer.

With reference to FIG. 8, in accordance with an embodiment, a communication system includes a telecommunication network 810, such as a 3GPP-type cellular network, which comprises an access network 811, such as a radio access network, and a core network 814. The access network 811 comprises a plurality of base stations 812a, 812b, 812c, such as NBs, eNBs, gNBs or other types of wireless access points, each defining a corresponding coverage area 813a, 813b, 813c. Each base station 812a, 812b, 812c is connectable to the core network 814 over a wired or wireless connection 815. A first UE 891 located in a coverage area 813c is configured to wirelessly connect to, or be paged by, the corresponding base station 812c. A second UE 892 in a coverage area 813a is wirelessly connectable to the corresponding base station 812a. While a plurality of UEs 891, 892 are illustrated in this example, the disclosed embodiments are equally applicable to a situation where a sole UE is in the coverage area or where a sole UE is connecting to the corresponding base station 812.

The telecommunication network 810 is itself connected to a host computer 830, which may be embodied in the hardware and/or software of a standalone server, a cloud-implemented server, a distributed server or as processing resources in a server farm. The host computer 830 may be under the ownership or control of a service provider, or may be operated by the service provider or on behalf of the service provider. Connections 821 and 822 between the telecommunication network 810 and the host computer 830 may extend directly from the core network 814 to the host computer 830 or may go via an optional intermediate network 820. An intermediate network 820 may be one of, or a combination of more than one of, a public, private or hosted network; the intermediate network 820, if any, may be a backbone network or the Internet; in particular, the intermediate network 820 may comprise two or more sub-networks (not shown).

The communication system of FIG. 8 as a whole enables connectivity between the connected UEs 891, 892 and the host computer 830. The connectivity may be described as an over-the-top (OTT) connection 850. The host computer 830 and the connected UEs 891, 892 are configured to communicate data and/or signaling via the OTT connection 850, using the access network 811, the core network 814, any intermediate network 820 and possible further infrastructure (not shown) as intermediaries. The OTT connection 850 may be transparent in the sense that the participating communication devices through which the OTT connection 850 passes are unaware of routing of uplink and downlink communications. For example, the base station 812 may not or need not be informed about the past routing of an incoming downlink communication with data originating from the host computer 830 to be forwarded (e.g., handed over) to a connected UE 891. Similarly, the base station 812 need not be aware of the future routing of an outgoing uplink communication originating from the UE 891 towards the host computer 830.

Example implementations, in accordance with an embodiment, of the UE, base station and host computer discussed in the preceding paragraphs will now be described with reference to FIG. 9. In a communication system 900, a host computer 910 comprises hardware 915 including a communication interface 916 configured to set up and maintain a wired or wireless connection with an interface of a different communication device of the communication system 900. The host computer 910 further comprises a processing circuitry 918, which may have storage and/or processing capabilities. In particular, the processing circuitry 918 may comprise one or more programmable processors, application-specific integrated circuits, field programmable gate arrays or combinations of these (not shown) adapted to execute instructions. The host computer 910 further comprises software 911, which is stored in or accessible by the host computer 910 and executable by the processing circuitry 918. The software 911 includes a host application 912. The host application 912 may be operable to provide a service to a remote user, such as UE 930 connecting via an OTT connection 950 terminating at the UE 930 and the host computer 910. In providing the service to the remote user, the host application 912 may provide user data which is transmitted using the OTT connection 950.

The communication system 900 further includes a base station 920 provided in a telecommunication system and comprising hardware 925 enabling it to communicate with the host computer 910 and with the UE 930. The hardware 925 may include a communication interface 926 for setting up and maintaining a wired or wireless connection with an interface of a different communication device of the communication system 900, as well as a radio interface 927 for setting up and maintaining at least a wireless connection 970 with the UE 930 located in a coverage area (not shown in FIG. 9) served by the base station 920. The communication interface 926 may be configured to facilitate a connection 960 to the host computer 910. The connection 960 may be direct or it may pass through a core network (not shown in FIG. 9) of the telecommunication system and/or through one or more intermediate networks outside the telecommunication system. In the embodiment shown, the hardware 925 of the base station 920 further includes a processing circuitry 928, which may comprise one or more programmable processors, application-specific integrated circuits, field programmable gate arrays or combinations of these (not shown) adapted to execute instructions. The base station 920 further has software 921 stored internally or accessible via an external connection.

The communication system 900 further includes the UE 930 already referred to. Its hardware 935 may include a radio interface 937 configured to set up and maintain a wireless connection 970 with a base station serving a coverage area in which the UE 930 is currently located. The hardware 935 of the UE 930 further includes a processing circuitry 938, which may comprise one or more programmable processors, application-specific integrated circuits, field programmable gate arrays or combinations of these (not shown) adapted to execute instructions. The UE 930 further comprises software 931, which is stored in or accessible by the UE 930 and executable by the processing circuitry 938. The software 931 includes a client application 932. The client application 932 may be operable to provide a service to a human or non-human user via the UE 930, with the support of the host computer 910. In the host computer 910, an executing host application 912 may communicate with the executing client application 932 via the OTT connection 950 terminating at the UE 930 and the host computer 910. In providing the service to the user, the client application 932 may receive request data from the host application 912 and provide user data in response to the request data. The OTT connection 950 may transfer both the request data and the user data. The client application 932 may interact with the user to generate the user data that it provides.

Figure 9:
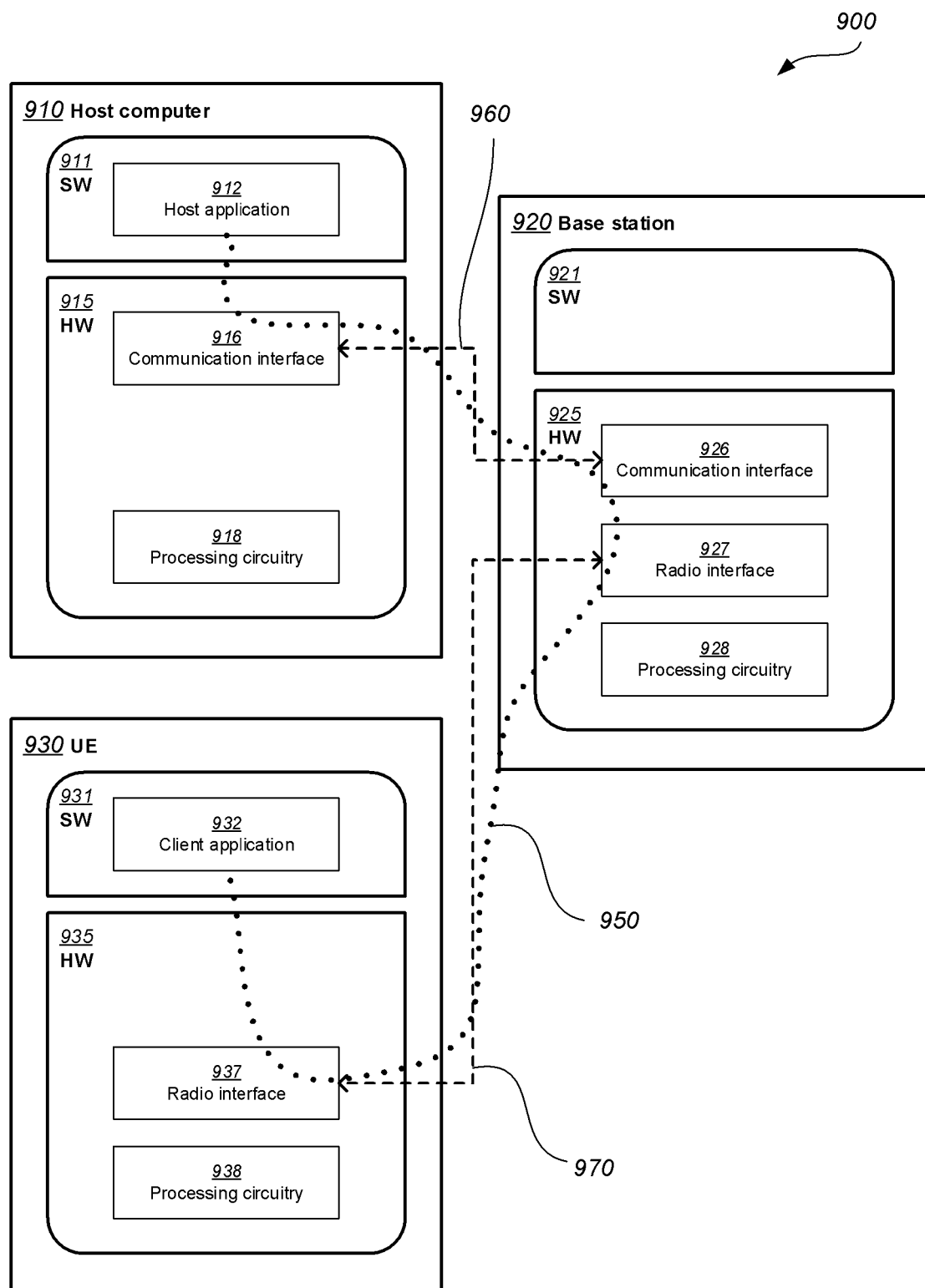
FIG. 9 is a generalized block diagram of a host computer communicating via a base station with a user equipment over a partially wireless connection.

It is noted that the host computer 910, the base station 920 and the UE 930 illustrated in FIG. 9 may be similar or identical to the host computer 830, one of base stations 812a, 812b, 812c and one of UEs 891, 892 of FIG. 8, respectively. This is to say, the inner workings of these entities may be as shown in FIG. 9 and independently, the surrounding network topology may be that of FIG. 8.

In FIG. 9, the OTT connection 950 has been drawn abstractly to illustrate the communication between the host computer 910 and the UE 930 via the base station 920, without explicit reference to any intermediary devices and the precise routing of messages via these devices. Network infrastructure may determine the routing, which it may be configured to hide from the UE 930 or from the service provider operating the host computer 910, or both. While the OTT connection 950 is active, the network infrastructure may further take decisions by which it dynamically changes the routing (e.g., on the basis of load balancing consideration or reconfiguration of the network).

Wireless connection 970 between the UE 930 and the base station 920 is in accordance with the teachings of the embodiments described throughout this disclosure. One or more of the various embodiments improve the performance of OTT services provided to the UE 930 using the OTT connection 950, in which the wireless connection 970 forms the last segment. More precisely, the teachings of these embodiments may improve the radio resource utilization and thereby provide benefits such as reduced user waiting time.

A measurement procedure may be provided for the purpose of monitoring data rate, latency and other factors on which the one or more embodiments improve. There may further be an optional network functionality for reconfiguring the OTT connection 950 between the host computer 910 and the UE 930, in response to variations in the measurement results. The measurement procedure and/or the network functionality for reconfiguring the OTT connection 950 may be implemented in software 911 and hardware 915 of the host computer 910 or in software 931 and hardware 935 of the UE 930, or both. In embodiments, sensors (not shown) may be deployed in or in association with communication devices through which the OTT connection 950 passes; the sensors may participate in the measurement procedure by supplying values of the monitored quantities exemplified above, or supplying values of other physical quantities from which the software 911, 931 may compute or estimate the monitored quantities. The reconfiguring of the OTT connection 950 may include message format, retransmission settings, preferred routing etc.; the reconfiguring need not affect the base station 920, and it may be unknown or imperceptible to the base station 920. Such procedures and functionalities may be known and practiced in the art.

In certain embodiments, measurements may involve proprietary UE signaling facilitating the host computer 910's measurements of throughput, propagation times, latency and the like. The measurements may be implemented in that the software 911 and 931 causes messages to be transmitted, in particular empty or 'dummy' messages, using the OTT connection 950 while it monitors propagation times, errors etc.

FIG. 10 is a flowchart illustrating a method implemented in a communication system, in accordance with an embodiment. The communication system includes a host computer, a base station and a UE which may be those described with reference to FIG. 8 and FIG. 9. For simplicity of the present disclosure, only drawing references to FIG. 10 will be included in this section. In step 1010, the host computer provides user data. In substep 1011 (which may be optional) of step 1010, the host computer provides the user data by executing a host application. In step 1020, the host computer initiates a transmission carrying the user data to the UE. In step 1030 (which may be optional), the base station transmits to the UE the user data which was carried in the transmission that the host computer initiated, in accordance with the teachings of the embodiments described throughout this disclosure. In step 1040 (which may also be optional), the UE executes a client application associated with the host application executed by the host computer.

FIG. 11 is a flowchart illustrating a method implemented in a communication system, in accordance with an embodiment. The communication system includes a host computer, a base station and a UE which may be those described with reference to FIG. 8 and FIG. 9. For simplicity of the present disclosure, only drawing references to FIG. 11 will be included in this section. In step 1110 of the method, the host computer provides user data. In an optional substep (not shown) the host computer provides the user data by executing a host application. In step 1120, the host computer initiates a transmission carrying the user data to the UE. The transmission may pass via the base station, in accordance with the teachings of the embodiments described throughout this disclosure. In step 1130 (which may be optional), the UE receives the user data carried in the transmission.

FIG. 12 is a flowchart illustrating a method implemented in a communication system, in accordance with an embodiment. The communication system includes a host computer, a base station and a UE which may be those described with reference to FIG. 8 and FIG. 9. For simplicity of the present disclosure, only drawing references to FIG. 12 will be included in this section. In step 1210 (which may be optional), the UE receives input data provided by the host computer. Additionally or alternatively, in step 1220, the UE provides user data. In substep 1221 (which may be optional) of step 1220, the UE provides the user data by executing a client application. In substep 1211 (which may be optional) of step 1210, the UE executes a client application which provides the user data in reaction to the received input data provided by the host computer. In providing the user data, the executed client application may further consider user input received from the user. Regardless of the specific manner in which the user data was provided, the UE initiates, in substep 1230 (which may be optional), transmission of the user data to the host computer. In step 1240 of the method, the host computer receives the user data transmitted from the UE, in accordance with the teachings of the embodiments described throughout this disclosure.

FIG. 13 is a flowchart illustrating a method implemented in a communication system, in accordance with an embodiment. The communication system includes a host computer, a base station and a UE which may be those described with reference to FIG. 8 and FIG. 9. For simplicity of the present disclosure, only drawing references to FIG. 13 will be included in this section. In step 1310 (which may be optional), in accordance with the teachings of the embodiments described throughout this disclosure, the base station receives user data from the UE. In step 1320 (which may be optional), the base station initiates transmission of the received user data to the host computer. In step 1330 (which may be optional), the host computer receives the user data carried in the transmission initiated by the base station.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in a terminal device, comprising:
   determining a DeModulation Reference Signal (DMRS) configuration for a Physical Uplink Shared Channel (PUSCH), wherein the DMRS configuration comprises a DMRS sequence and the determining the DMRS configuration comprises generating the DMRS sequence by using an identifier of a preamble as an initialization parameter; and
   transmitting to a network device the PUSCH using the DMRS configuration along with the preamble, in a random access message, wherein the random access message is a message A in a two-step random access procedure.

2. The method of claim 1, wherein said determining the DMRS configuration is based on one or more of:
   a frequency hopping configuration,
   a PUSCH mapping type,
   a PUSCH duration,
   a number of symbols for DMRS,
   a maximum number of additional DMRS symbols, or
   a Code Division Multiplexing (CDM) group type.

3. The method of claim 1, wherein the DMRS configuration comprises a time domain resource for DMRS, and said determining the DMRS configuration comprises determining the time domain resource for the DMRS based on one or more of:
   a frequency hopping configuration,
   a PUSCH mapping type,
   a PUSCH duration,
   a number of symbols for the DMRS,
   a maximum number of additional DMRS symbols, or
   a Code Division Multiplexing (CDM) group type.

4. The method of claim 2, wherein the one or more of the frequency hopping configuration, the PUSCH mapping type, the PUSCH duration, the number of symbols for the DMRS, the maximum number of additional DMRS symbols or the CDM group type are predetermined by default or determined based on a sequence for the preamble.

5. The method of claim 2, wherein the one or more of the frequency hopping configuration, the PUSCH mapping type, the PUSCH duration, the number of symbols for the DMRS, the maximum number of additional DMRS symbols or the CDM group type are received from the network device via signaling.

6. The method of claim 5, wherein the signaling comprises Radio Resource Control (RRC) signaling or Layer 1 signaling, the RRC signaling comprising a system information message, a dedicated signaling message, or both the system information message and the dedicated signaling message, and the Layer 1 signaling comprising Downlink Control Information (DCI).

7. The method of claim 2, wherein the maximum number of additional DMRS symbols is determined based on a moving speed of the terminal device.

8. The method of claim 3, wherein the time domain resource for the DMRS is determined based on a predetermined mapping between the time domain resource for the DMRS and the one or more of the frequency hopping configuration, the PUSCH mapping type, the PUSCH duration, the number of symbols for the DMRS, the maximum number of additional DMRS symbols or the CDM group type.

9. The method of claim 1, wherein the preamble is selected from a set of preambles reserved for two-step random access only.

10. A terminal device, comprising:
    a processor; and
    a memory, the memory comprising instructions which, when executed by the processor, cause the terminal device to:
       determine a DeModulation Reference Signal (DMRS) configuration for a Physical Uplink Shared Channel (PUSCH), wherein the DMRS configuration comprises a DMRS sequence and to determine the DMRS configuration comprises to generate the DMRS sequence by using an identifier of a preamble as an initialization parameter; and
       transmit to a network device the PUSCH using the DMRS configuration along with the preamble, in a random access message, wherein the random access message is a message A in a two-step random access procedure.

11. A method in a network device, comprising:
    detecting a preamble from a terminal device, as a part of a random access message, the random access message further comprising a Physical Uplink Shared Channel (PUSCH) wherein the random access message is a message A in a two-step random access procedure; and determining a DeModulation Reference Signal (DMRS) configuration for the PUSCH, wherein the DMRS configuration comprises a DMRS sequence, in which the DMRS sequence is generated by using an identifier of the preamble as an initialization parameter.

12. The method of claim 11, wherein said determining the DMRS configuration is based on one or more of:
a frequency hopping configuration,
a PUSCH mapping type,
a PUSCH duration,
a number of symbols for the DMRS,
a maximum number of additional DMRS symbols, or
a Code Division Multiplexing (CDM) group type.

13. The method of claim 11, wherein the DMRS configuration comprises a time domain resource for DMRS, and said determining the DMRS configuration comprises determining the time domain resource for DMRS based on one or more of:
a frequency hopping configuration,
a PUSCH mapping type,
a PUSCH duration,
a number of symbols for the DMRS,
a maximum number of additional DMRS symbols, or
a Code Division Multiplexing (CDM) group type.

14. The method of claim 12, wherein the one or more of the frequency hopping configuration, the PUSCH mapping type, the PUSCH duration, the number of symbols for the DMRS, the maximum number of additional DMRS symbols or the CDM group type are predetermined by default or determined based on a sequence.

15. The method of claim 12, further comprising:
transmitting the one or more of the frequency hopping configuration, the PUSCH mapping type, the PUSCH duration, the number of symbols for the DMRS, the maximum number of additional DMRS symbols or the CDM group type to the terminal device via signaling.

16. The method of claim 15, wherein the signaling comprises Radio Resource Control (RRC) signaling or Layer 1 signaling, the RRC signaling comprising a system information message, a dedicated signaling message, or both the system information message and the dedicated signaling message, and the Layer 1 signaling comprising Downlink Control Information (DCI).

17. The method of claim 13, wherein the time domain resource for the DMRS is determined based on a predetermined mapping between the time domain resource for the DMRS and the one or more of the frequency hopping configuration, the PUSCH mapping type, the PUSCH duration, the number of symbols for the DMRS, the maximum number of additional DMRS symbols or the CDM group type.

18. A network device comprising:
a processor; and
a memory, the memory (730) comprising instructions which, when executed by the processor, cause the network device to:
detect a preamble from a terminal device, as a part of a random access message, the random access message further comprising a Physical Uplink Shared Channel (PUSCH) wherein the random access message is a message A in a two-step random access procedure; and
determine a DeModulation Reference Signal (DMRS) configuration for the PUSCH, wherein the DMRS configuration comprises a DMRS sequence, in which the DMRS sequence is generated by using an identifier of the preamble as an initialization parameter.

* * * * *

UNITED STATES PATENT AND TRADEMARK OFFICE
CERTIFICATE OF CORRECTION

PATENT NO. : 11,483,875 B2  
APPLICATION NO. : 17/430320  
DATED : October 25, 2022  
INVENTOR(S) : Lin et al.

Page 1 of 1

It is certified that error appears in the above-identified patent and that said Letters Patent is hereby corrected as shown below:

On the Title Page

On Page 2, in Item (56), under "OTHER PUBLICATIONS", in Column 2, Line 31, delete "(3 page" and insert -- (3 pages --, therefor.

In the Specification

In Column 1, Line 35, delete "Information (OSI)," and insert -- Information (OSI)), --, therefor.

In Column 8, Line 40, delete "(WiMax)," and insert -- (WiMAX), --, therefor.

In Column 9, Line 34, delete "(IOT)" and insert -- (IoT) --, therefor.

In Column 10, Line 39, delete "be depend" and insert -- depend --, therefor.

In Column 16, Line 2, delete "$f_{fg}$" and insert -- $f_{gh}$ --, therefor.

In Column 16, Line 2, delete "v" and insert -- $\nu$ --, therefor.

In Column 25, Line 57, delete "which it may be" and insert -- which may be --, therefor.

In Column 26, Line 30, delete "computer 910's" and insert -- computer's 910 --, therefor.

In Column 27, Line 20, delete "substep 1230" and insert -- step 1230 --, therefor.

In the Claims

In Column 30, Line 21, in Claim 18, delete "memory (730)" and insert -- memory --, therefor.

Signed and Sealed this  
Twenty-third Day of May, 2023

Katherine Kelly Vidal  
*Director of the United States Patent and Trademark Office*